(12) United States Patent
Lott

(10) Patent No.: US 12,488,152 B1
(45) Date of Patent: Dec. 2, 2025

(54) DISARMABLE TAMPER EVIDENT PORT PROTECTOR

(71) Applicant: The Government of the United States as represented by the Director, National Security Agency, Ft. George G. Meade, MD (US)

(72) Inventor: Steven R. Lott, Parkville, MD (US)

(73) Assignee: The Government of the United States as represented by the Director, National Security Agency, Ft. George G. Meade, MD (US)

( * ) Notice: Subject to any disclaimer, the term of this patent is extended or adjusted under 35 U.S.C. 154(b) by 392 days.

(21) Appl. No.: 18/091,558

(22) Filed: Dec. 30, 2022

(51) Int. Cl.
*G06F 21/88* (2013.01)

(52) U.S. Cl.
CPC .................................. *G06F 21/88* (2013.01)

(58) Field of Classification Search
CPC ....................................................... G06F 21/88
See application file for complete search history.

(56) References Cited

U.S. PATENT DOCUMENTS

| | | |
|---|---|---|
| 5,642,805 A | 7/1997 | Tefft |
| 6,796,152 B1 | 9/2004 | Yu |
| 6,802,723 B2 | 10/2004 | Decime et al. |
| 6,991,479 B2 | 1/2006 | Miao |
| 7,083,438 B2 | 8/2006 | Massaro et al. |
| 7,128,586 B2 | 10/2006 | Kung |
| 7,160,137 B1 | 1/2007 | Yeh |
| 7,223,574 B2 | 5/2007 | Lei et al. |
| 7,275,941 B1 | 10/2007 | Bushby |
| 7,390,201 B1 | 6/2008 | Quinby et al. |
| 7,428,834 B1 | 9/2008 | Lee |
| 7,462,045 B1 | 12/2008 | Lee |
| 7,479,021 B2 | 1/2009 | Huang |
| 7,530,824 B2 * | 5/2009 | Bolain ............... H01R 13/6397 439/147 |
| 7,563,113 B2 | 7/2009 | Sheng |
| 7,581,417 B1 | 9/2009 | Chen |
| 7,635,272 B2 | 12/2009 | Poppe |
| 7,677,065 B1 | 3/2010 | Miao |
| 7,722,369 B2 | 5/2010 | Bushby |
| 7,794,245 B2 | 9/2010 | Thompson |
| 7,913,527 B2 | 3/2011 | Chen |

(Continued)

*Primary Examiner* — Taghi T Arani
*Assistant Examiner* — Blake I Narramore

(57) ABSTRACT

A disarmable port protector for locking engagement of a communication port of electronic equipment includes a lock body for retentively engaging the communication port when disposed at a locking position. The lock body includes an interface portion and an engagement portion extending longitudinally therefrom. A key body coupled to the lock body is displaceable between protecting and disarming positions relative to the lock body. The key body includes a base portion and a disarming portion extending longitudinally therefrom. The disarming portion in the disarming position disengages the lock body from the communication port for withdrawal from the locking position. A keying portion extends from the base portion for stopping engagement of the lock body when in the protecting position. The key body is released for displacement to the disarming position upon the keying portion being at least partially displaced relative to the base portion in tamper evident manner.

20 Claims, 42 Drawing Sheets

(56) References Cited

U.S. PATENT DOCUMENTS

| | | |
|---|---|---|
| 8,029,299 B1 | 10/2011 | Huang |
| 8,142,212 B2 | 3/2012 | McSweeney et al. |
| 8,414,314 B1 | 4/2013 | Mosholder |
| 8,449,309 B1 | 5/2013 | Mosholder |
| 9,710,677 B1 | 7/2017 | Mosholder |
| 2003/0224637 A1 | 12/2003 | Ling |
| 2003/0228777 A1 | 12/2003 | Lai |
| 2005/0039502 A1 | 2/2005 | Avganim |
| 2005/0164548 A1 | 7/2005 | Spears et al. |
| 2005/0202698 A1 | 9/2005 | Miao |
| 2006/0107073 A1 | 5/2006 | Lane et al. |
| 2006/0134952 A1 | 6/2006 | Meister et al. |
| 2006/0234533 A1 | 10/2006 | Lei et al. |
| 2007/0037454 A1 | 2/2007 | Bushby |
| 2007/0162655 A1 | 7/2007 | Huang |
| 2008/0041125 A1* | 2/2008 | Poppe ............... H01R 13/6397 70/57 |
| 2009/0042433 A1 | 2/2009 | Bushby |
| 2009/0117763 A1 | 5/2009 | Chen |
| 2010/0009565 A1 | 1/2010 | Wang |
| 2010/0033913 A1 | 2/2010 | Cao |
| 2012/0073000 A1* | 3/2012 | Sheu ..................... G06F 21/88 726/35 |
| 2012/0108088 A1 | 5/2012 | Peng et al. |
| 2012/0289069 A1* | 11/2012 | Chueh ............... H01R 13/6397 439/135 |
| 2013/0029505 A1 | 1/2013 | Hackett |
| 2013/0102167 A1* | 4/2013 | Litowitz ........... H01R 13/5213 439/135 |
| 2016/0196454 A1* | 7/2016 | Soffer .................... G06F 21/85 726/16 |
| 2016/0294118 A1* | 10/2016 | Ahn ..................... H01R 13/633 |
| 2019/0036266 A1* | 1/2019 | Gustaveson .......... E05B 35/008 |
| 2021/0327177 A1* | 10/2021 | Kirkjan ............. G07C 9/00309 |
| 2022/0069525 A1* | 3/2022 | Fridman ................ G06F 21/85 |
| 2023/0122882 A1* | 4/2023 | Bae ...................... H01R 24/60 439/701 |

* cited by examiner

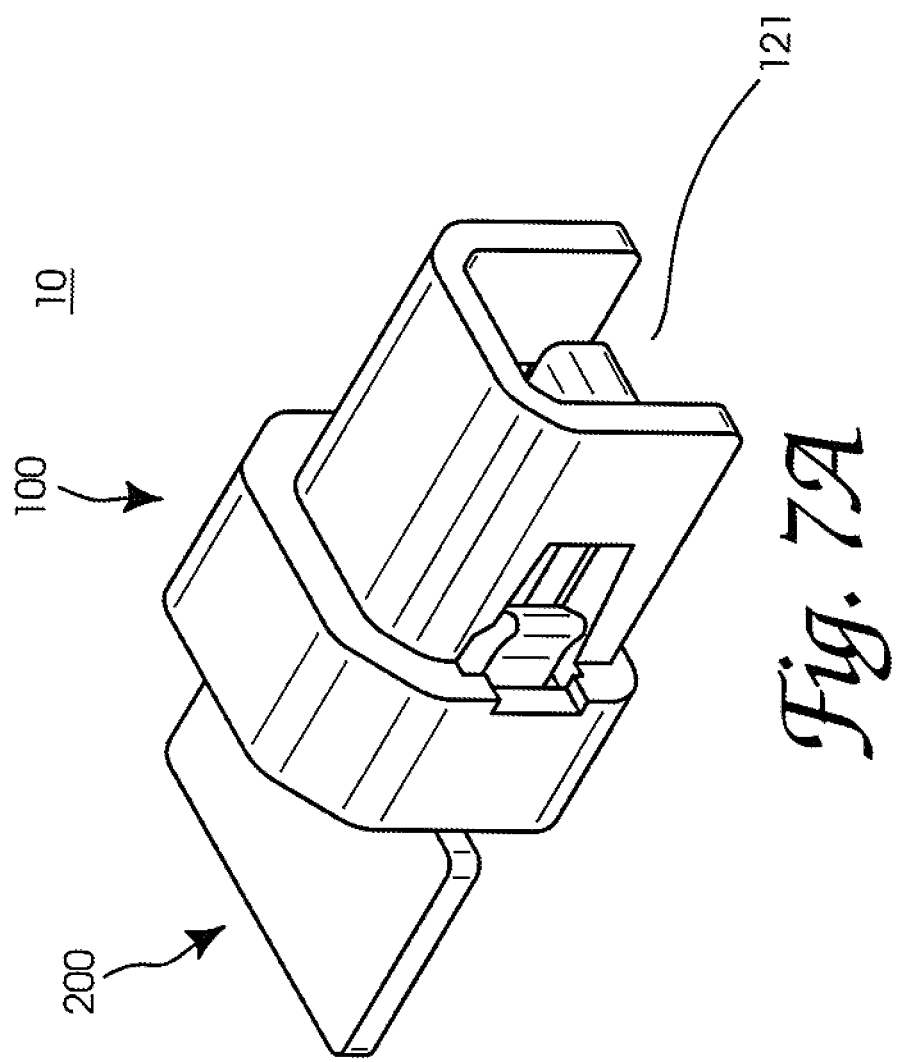

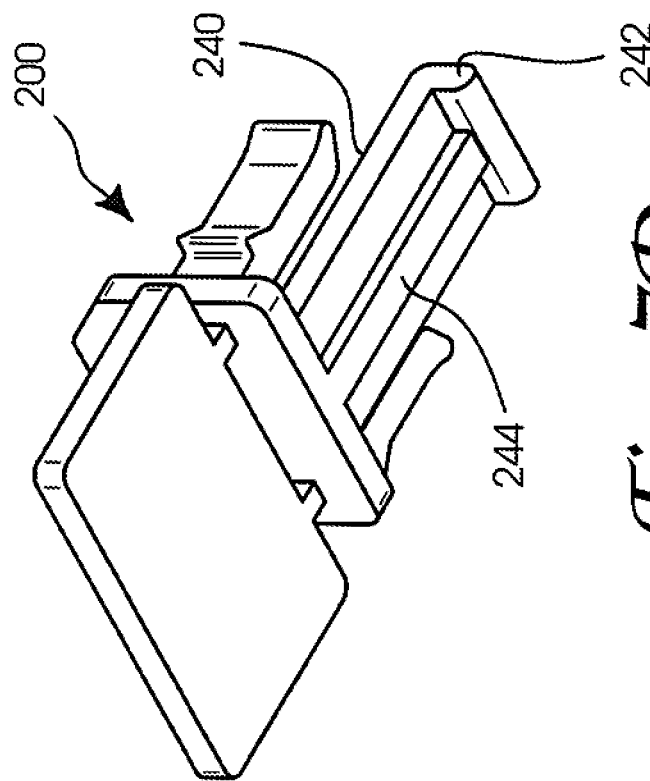
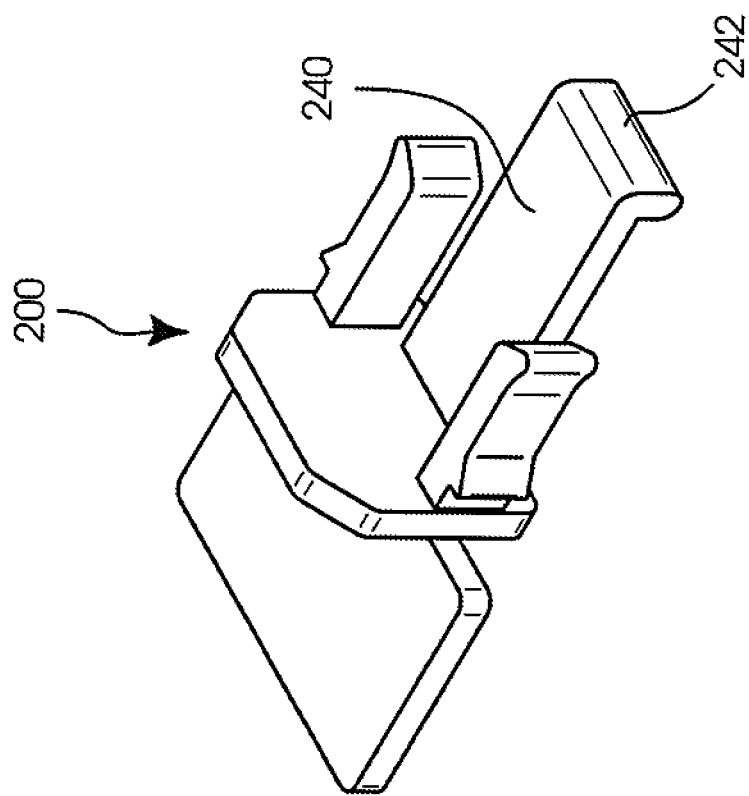
Fig. 7D
Fig. 7C

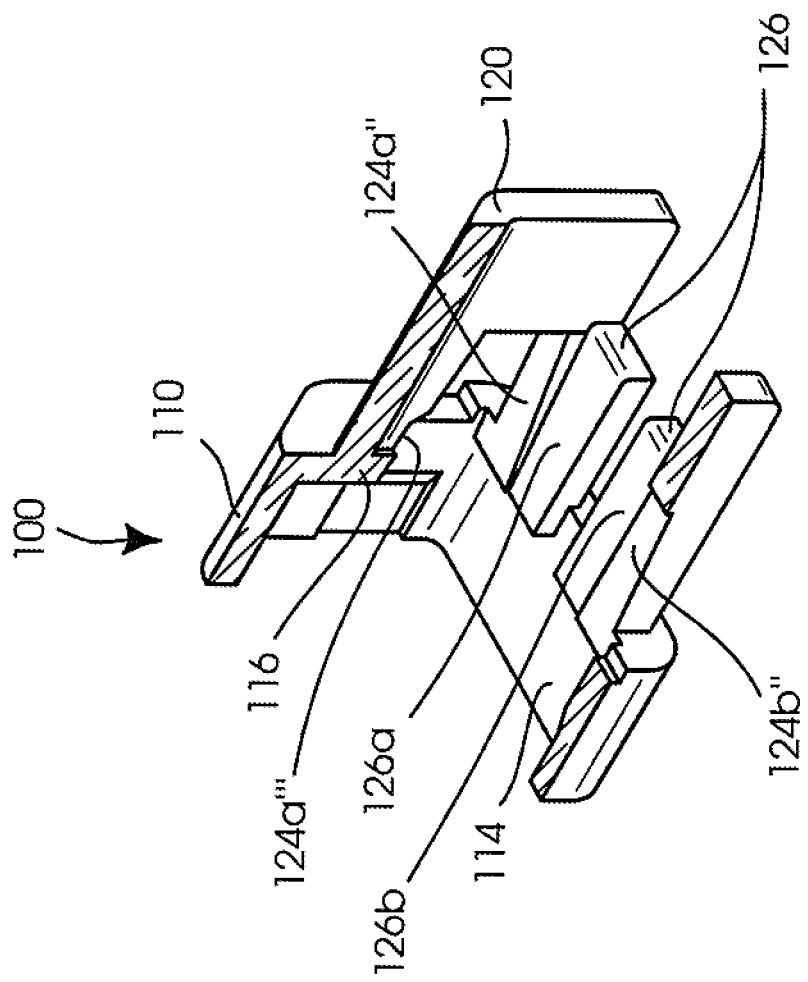

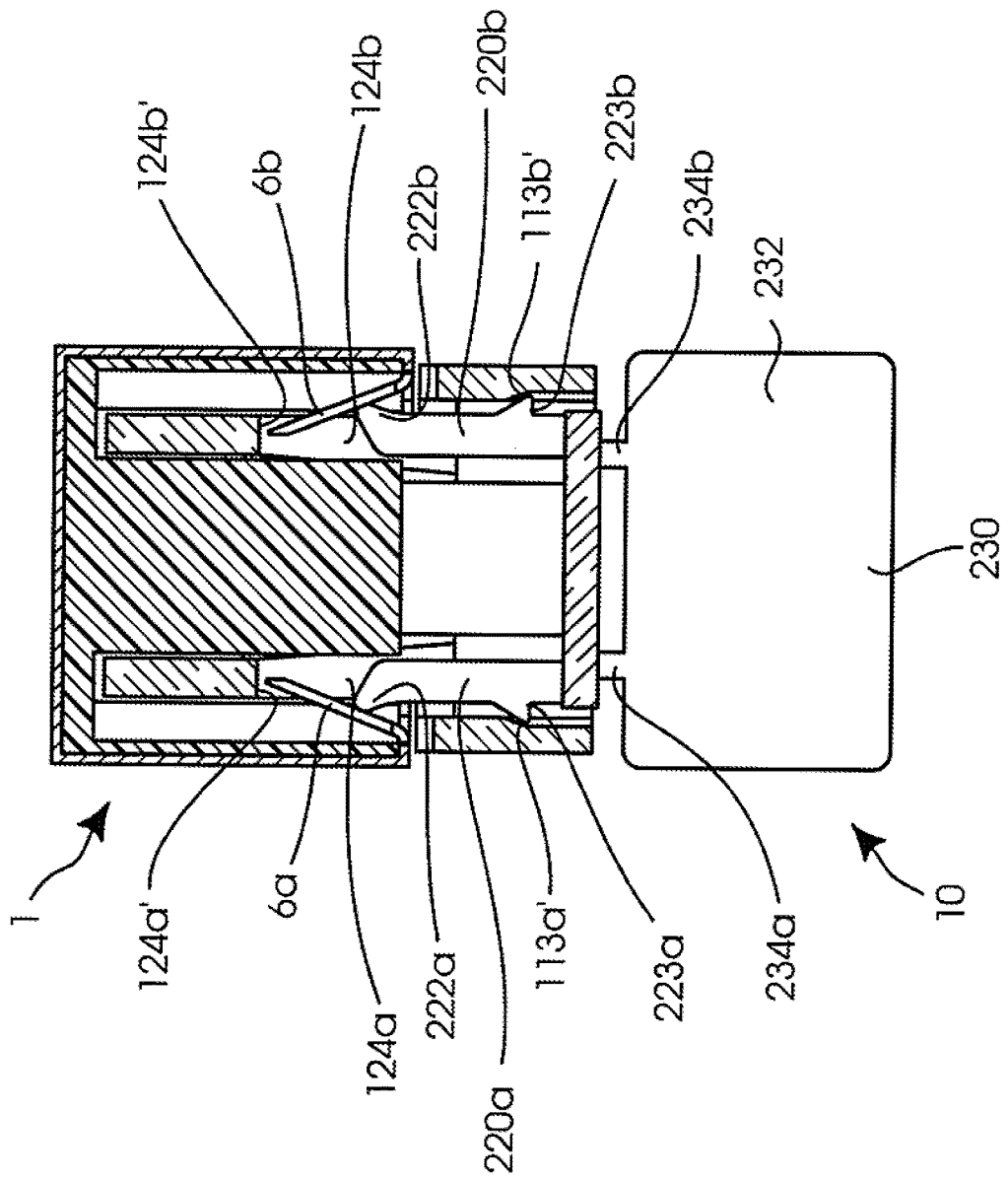

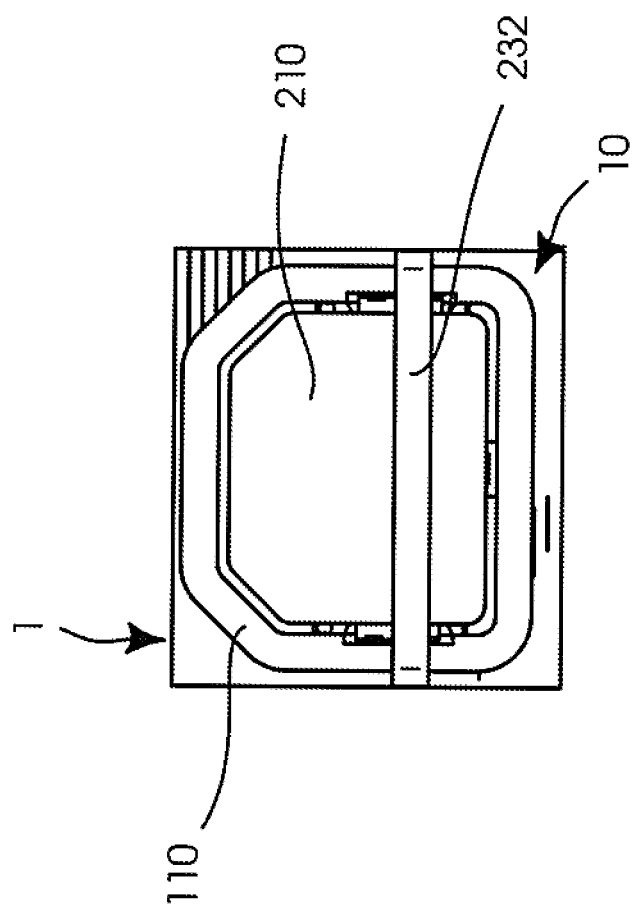

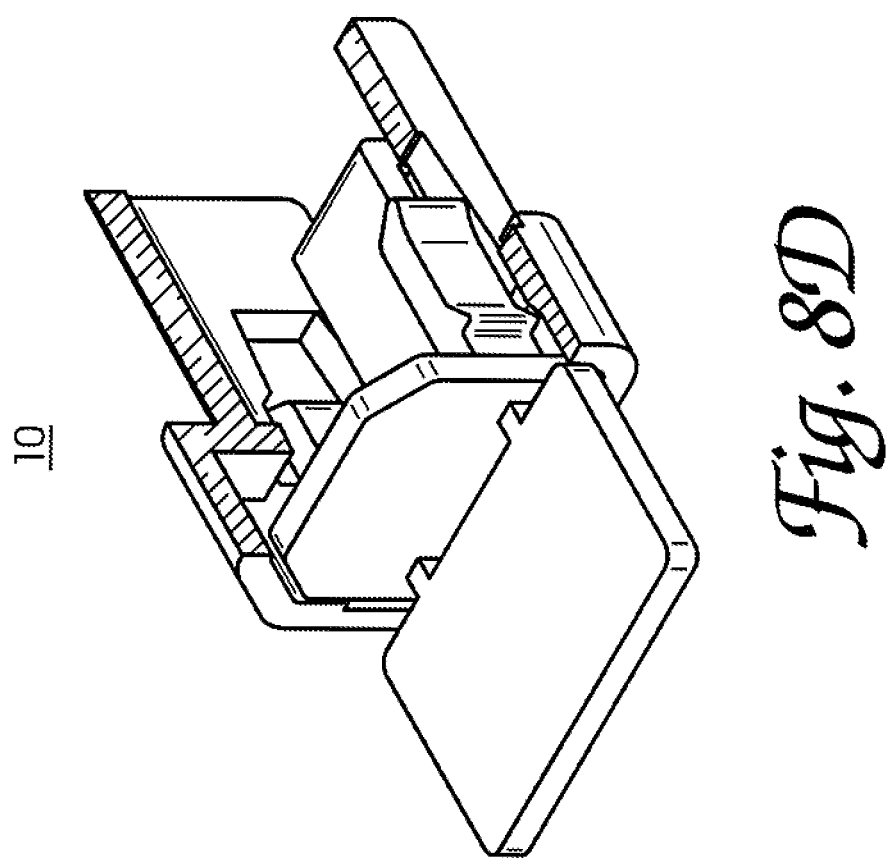

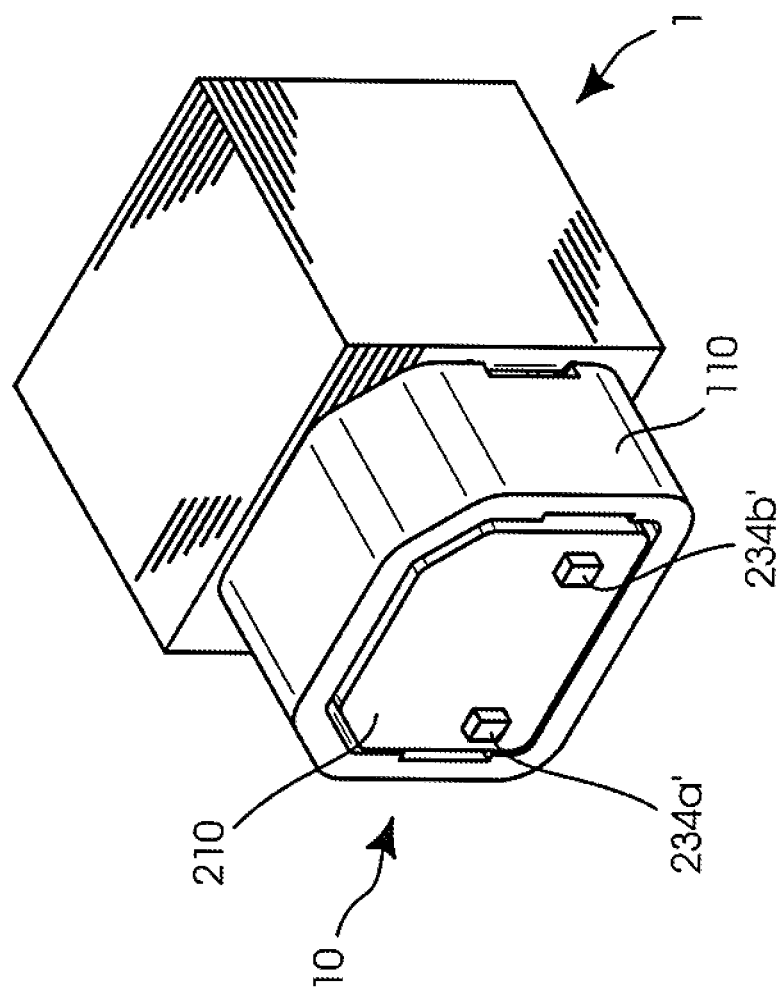

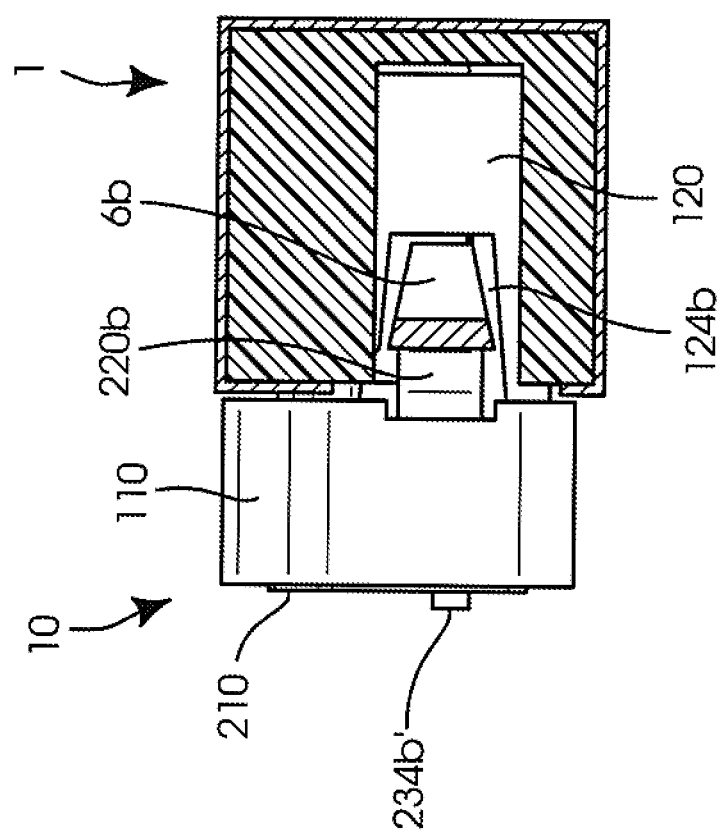

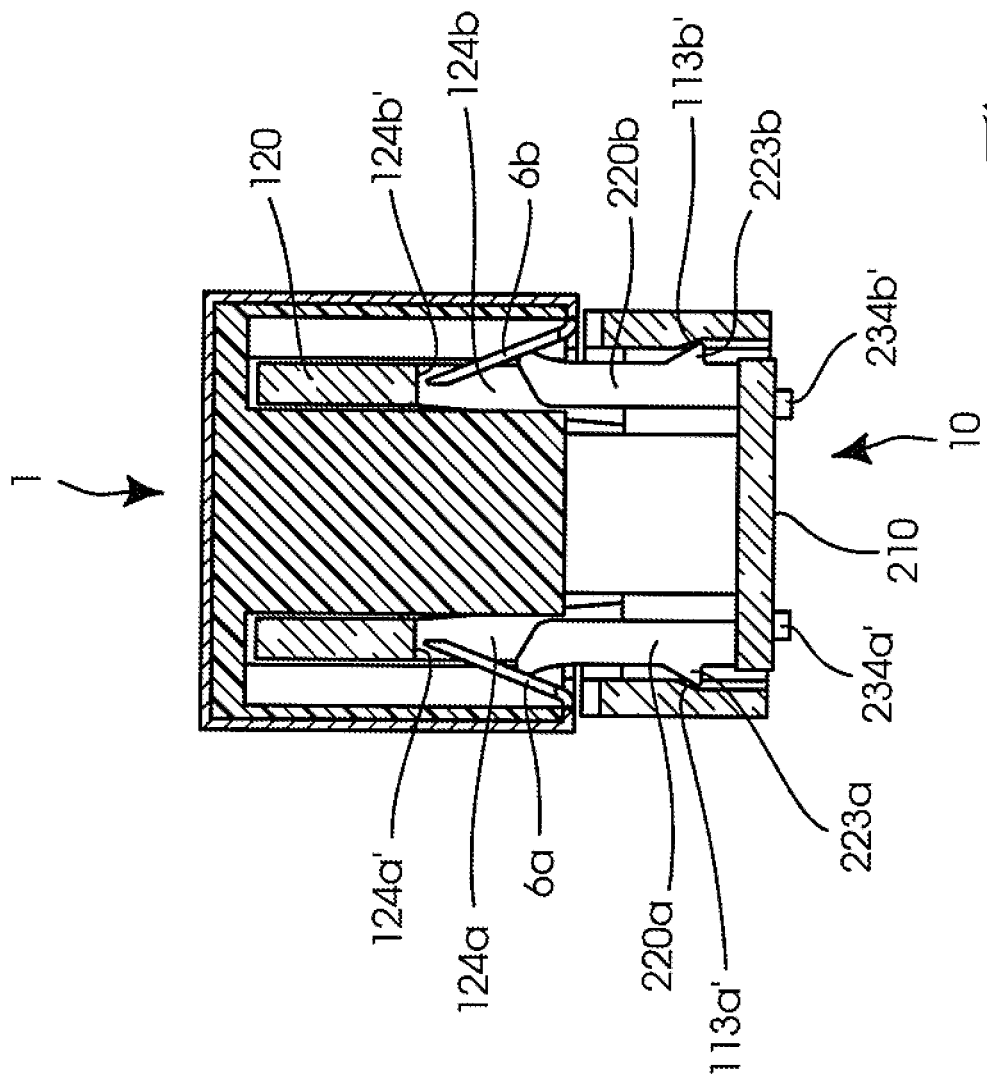

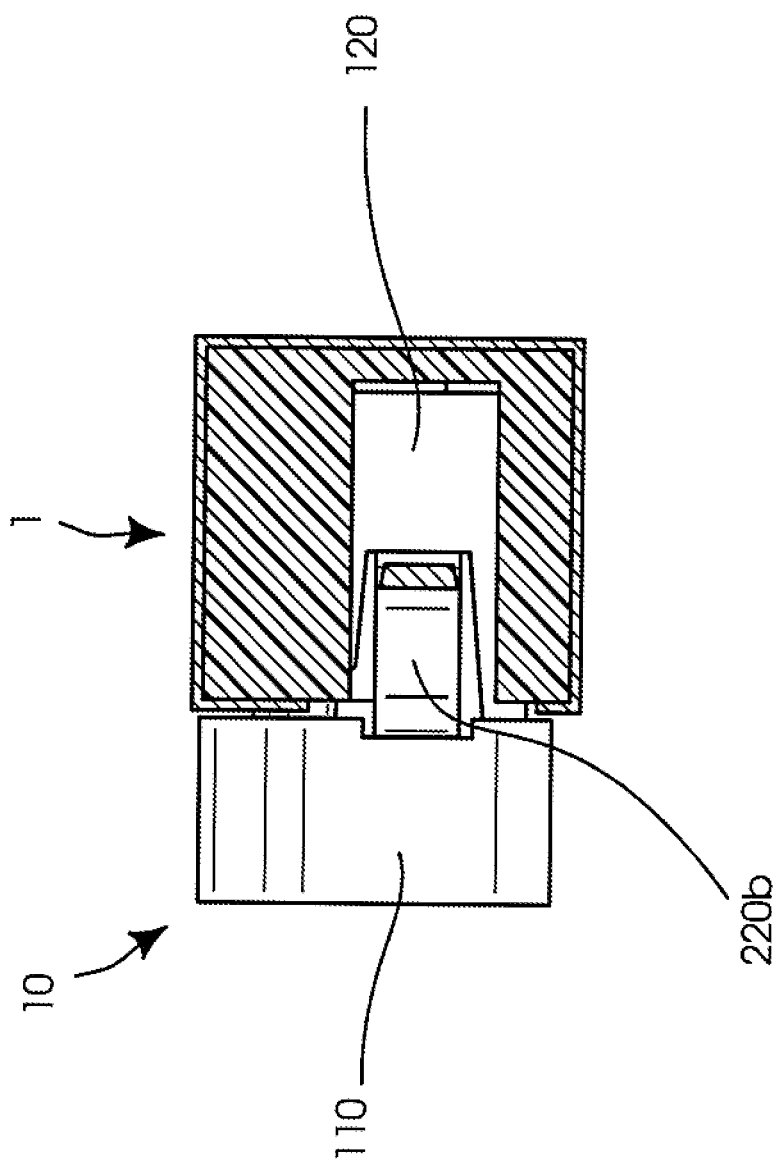

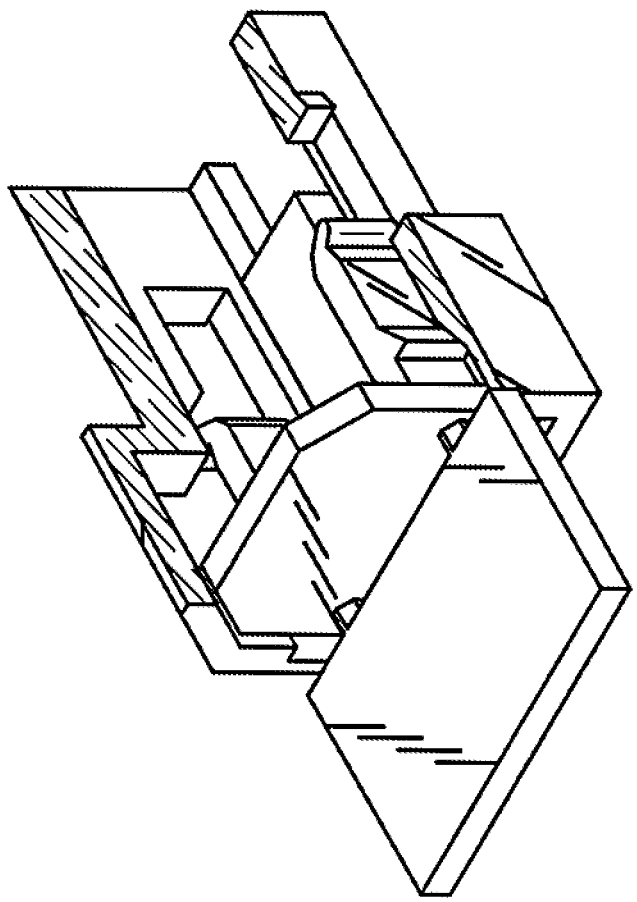

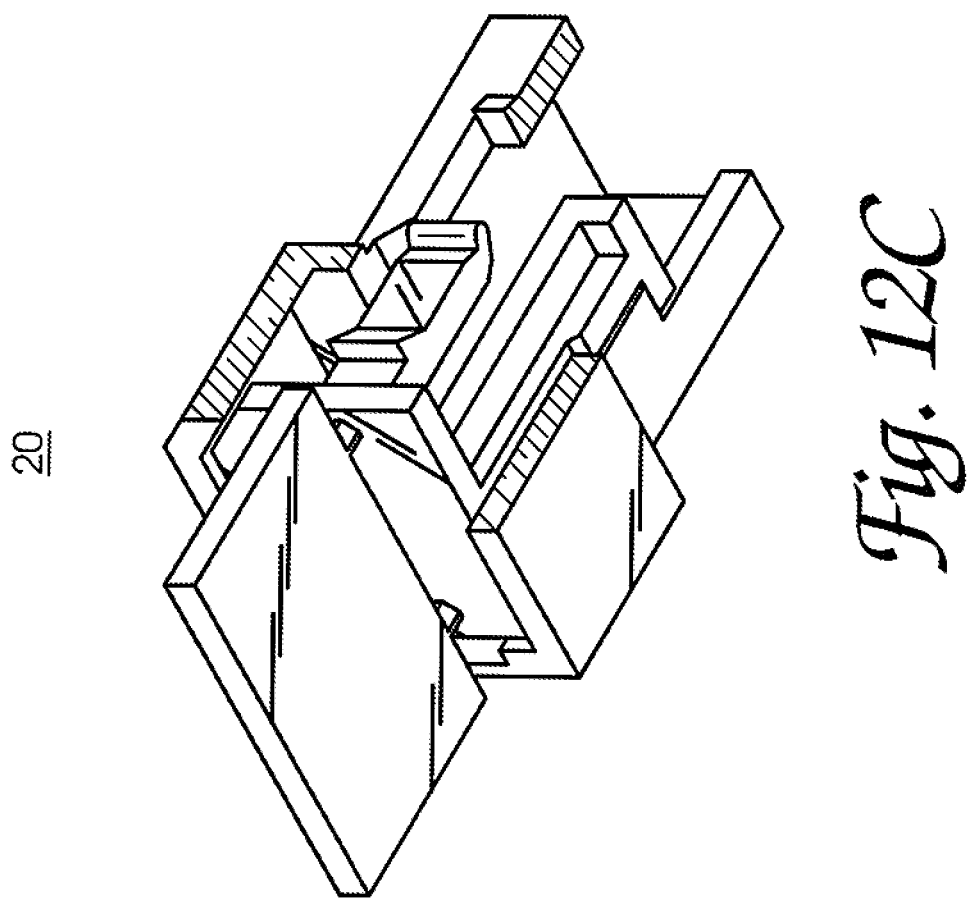

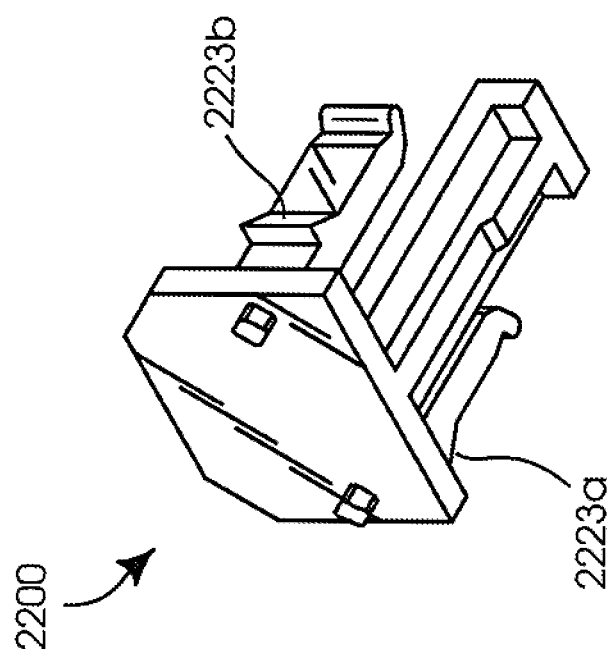

DISARMABLE TAMPER EVIDENT PORT PROTECTOR

FIELD OF THE INVENTION

The present invention is generally directed to a port protector for use with a communication port provided on various electronic equipment. More specifically, the present invention is directed to a tamper evident port protector which, when installed in a communication port, locks in place to physically obstruct access to such communication port and provide conspicuous indication of tampering in the event forcible unauthorized access to the communication port is made or attempted thereafter. The port protector is equipped with onboard measures for tamper evident disarming to facilitate removal from the communication port.

BACKGROUND OF THE INVENTION

Communication ports are known in the art. They include data ports of numerous types and configurations provided on various electronic equipment for interconnection of communications media thereto. For example, one or more USB (Universal Serial Bus), HDMI (High Definition Multimedia Interface), SFP (Small Form-factor Pluggable), or other such data port types are typically provided on computers, communication devices, or on-vehicle consoles for communications interface coupling thereto. The intercoupling components of these data ports remain openly exposed in many applications when not actually coupled to external communications media for use, rendering the given equipment vulnerable to unauthorized access to its contents and controls during periods of non-use.

Port protection measures are known in the art. But the level of tamper evident protection they offer against efforts to defeat the protection, and the ease of use they offer vary widely. Port protection measures heretofore known lack the full combination of secure self-locking to a communication port, tamper evident safeguards against attempts to forcibly unlock it from the communication port, built-in tamper evident disarming features to facilitate convenient removal from the communication port, and the simplicity of structure and function to facilitate convenient yet reliable use.

There is therefore a need for a port protector to address existing vulnerabilities in conventional communication ports provided on various electronic equipment. There is a need for such port protector which substantially and securely blocks unrestricted access to a communication port when the port is not in use, and which yields conspicuous residual indication of any tampering to gain unauthorized access to or through the communication port. There is a need for such port protector that is readily disarmable in tamper evident manner to facilitate removal from the communication port, and sufficiently simple in structure and function to facilitate ease of handling and use.

SUMMARY OF THE INVENTION

It is an object of the present invention to protect a communication port by substantially and securely blocking access to the communication port during a period of non-use.

It is another object of the present invention to provide conspicuous residual indication of any tampering to gain unauthorized access to or through the communication port despite such protection.

It is yet another object of the present invention to provide protection for a communication port that is readily disarmable in tamper evident manner to facilitate removal.

It is still another object of the present invention to provide protection for a communication port through a device that is simple enough in structure and function to facilitate convenient handling and use.

These and other objects are attained by a disarmable port protector for locking engagement of a communication port of electronic equipment. The disarmable port protector includes a lock body for retentively engaging the communication port when disposed at a locking position, the lock body having an interface portion and an engagement portion extending longitudinally therefrom. A key body is displaceably coupled to the lock body, and the key body is displaceable from at least a protecting position to a disarming position relative to the lock body. The key body includes a base portion and a disarming portion extending longitudinally from the base portion. The disarming portion in the disarming position disengages the lock body from the communication port for withdrawal from the locking position. The key body also includes a keying portion extending from the base portion for stopping engagement of the lock body when in the protecting position. The key body is released for displacement to the disarming position upon the keying portion being at least partially displaced relative to the base portion in tamper evident manner.

In accordance with certain other embodiments, there is provided a port protector having tamper evident disarmament for releasable locking insert into a communication port of electronic equipment. The port protector includes a lock body configured to retentively engage the communication port when disposed at a locking position therein. The lock body includes an interface portion defining an interface chamber and an engagement portion defining an engagement chamber extending longitudinally therefrom. The engagement portion in the locking position is at least partially inserted into and retentively engaged with the communication port. A key body is coupled in coaxially displaceable manner to the lock body, which key body is displaceable into the engagement chamber of the lock body from a protecting position to a disarming position relative thereto. The key body includes a base portion configured to extend transversely across the interface chamber of the lock body to substantially block access therethrough when in the protecting position. A tongue portion extends longitudinally from the base portion for retentively engaging the lock body when in the protecting position. A disarming portion extends longitudinally from the base portion into the engagement chamber when in the disarming position for releasing the lock body from retentive engagement with the communication port. A keying portion extends from the base portion, and the keying portion in the protecting position is stopped by the interface portion of the lock body to prevent further axial displacement of the key body into the lock body toward the disarming position. The key body is released for displacement to the disarming position upon the keying portion being at least partially displaced relative to the base portion in tamper evident manner.

In accordance with certain additional embodiments, a reconfigurable port protector is provided having an onboard disarming for tamper evident release from locking engagement of a communication port of electronic equipment. The reconfigurable port protector includes a lock body configured to retentively engage the communication port when disposed at a locking position therein. The lock body is formed with an interface portion defining an interface chamber and an engagement portion defining an engagement chamber in communication with the interface chamber. The engagement portion in the locking position is at least partially inserted into and retentively engaged with the communication port. A key body is coupled in coaxially displaceable manner to the lock body, the key body being displaceable into the engagement chamber of the lock body from a protecting position to a disarming position relative thereto. The key body when in the disarming position is secured to the lock body to maintain the reconfigurable port protector in a disarmed configuration for unobstructed removal from the communication port. The key body includes a base portion configured to extend transversely across the interface chamber of the lock body to substantially block access therethrough when in the protecting position. A tongue portion extends longitudinally from the base portion for retentively engaging the lock body when in the protecting position. A disarming portion extends longitudinally from the base portion into the engagement chamber when in the disarming position for releasing the lock body from retentive engagement with the communication port. A keying portion extends from the base portion to be stopped by the interface portion of the lock body when in the protecting position to prevent further axial displacement of the key body into the lock body toward the disarming position. The keying portion is joined to the base portion by at least one frangible coupling. The key body is released for displacement to the disarming position relative to the lock body in tamper evident manner responsive to the frangible coupling being severed, the keying portion thereby being at least partially detached from the base portion for releasing displacement away from the interface portion of the lock body.

BRIEF DESCRIPTION OF THE DRAWINGS

Various aspects of the present invention, as well as the structural and operational features of certain exemplary embodiments disclosed herein, may be better understood by reference to the following description, taken in connection with the accompanying drawings, wherein like reference numerals and characters identify like elements, in which:

FIG. 7A is a perspective view of the embodiment shown in FIG. 7, from a rearward-down viewing orientation;

FIG. 7C is a perspective view of a certain isolated part of the embodiment shown in FIG. 7, from the rearward-down viewing orientation;

FIG. 7D is a perspective view of the isolated part of the embodiment shown in FIG. 7C, from a forward-up viewing orientation;

FIG. 7F is a perspective view, partially cut away, of the other isolated part of the embodiment shown in FIG. 7E, from the rearward-down viewing orientation;

FIG. 8B is a sectional plan view of the embodiment as shown in FIG. 8 installed in the conventional communication port;

FIG. 8C is a front elevational view of the embodiment as shown in FIG. 8 installed in the conventional communication port;

FIG. 8D is the perspective view, partially cut away, of the embodiment as shown in FIG. 7;

FIG. 9 is the perspective view of the embodiment as shown in FIG. 8 installed in the conventional communication port, with a keying portion thereof at least partially removed in preparation for a disarming reconfiguration;

FIG. 9A is a sectional side view of the embodiment as shown in FIG. 9 installed in the conventional communication port and prepared for disarming reconfiguration;

FIG. 9B is a sectional plan view of the embodiment as shown in FIG. 9 installed in the conventional communication port and prepared for disarming reconfiguration;

FIG. 10A is a sectional side view of the installed embodiment as shown in FIG. 10 in the disarming configuration thereof;

FIG. 12B is a perspective view, partially cut away, of the alternate embodiment shown in FIG. 12, but as fully assembled to the armed configuration thereof;

FIG. 12C is a perspective view, partially cut away, of the alternate embodiment as shown in FIG. 12B, but viewed from a forward-up viewing orientation;

FIG. 12D is a perspective view of a certain isolated part of the alternate embodiment as shown in FIG. 12C, but with a keying portion thereof at least partially removed in preparation for displacement relative to another part of the embodiment from a protecting position to a disarming position;

DETAILED DESCRIPTION OF THE PREFERRED EMBODIMENTS

Figure 2:
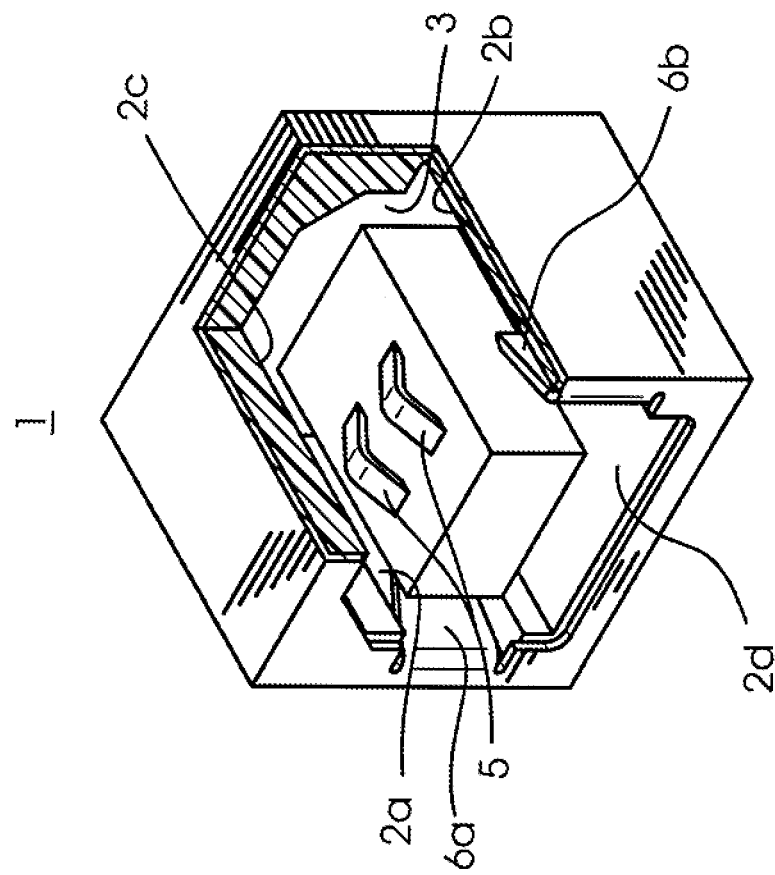
FIG. 2 is a schematic perspective view, partially cut away, of the conventional communication port shown in FIG. 1.
Figure 1:
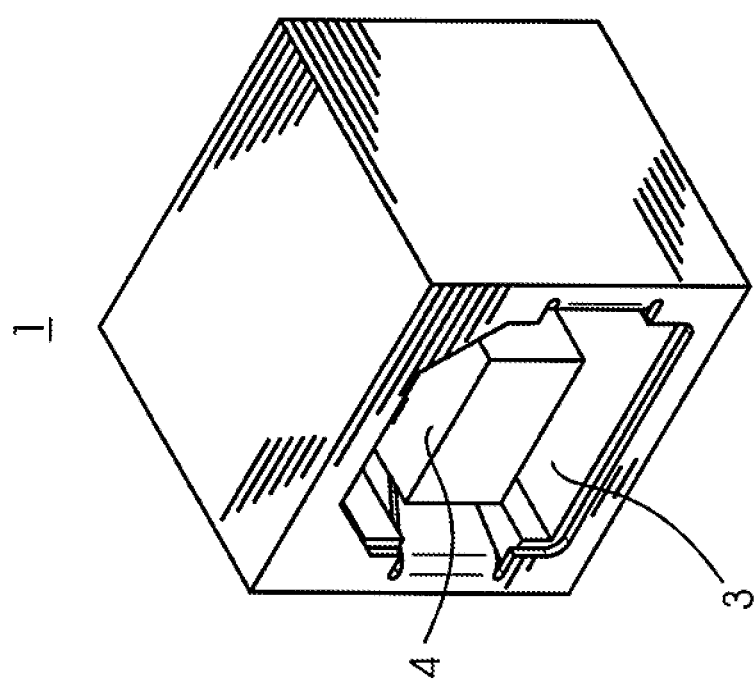
FIG. 1 is a schematic perspective view, partially cut away, of a conventional communication port of illustrative type known in the art.
Figure 4:
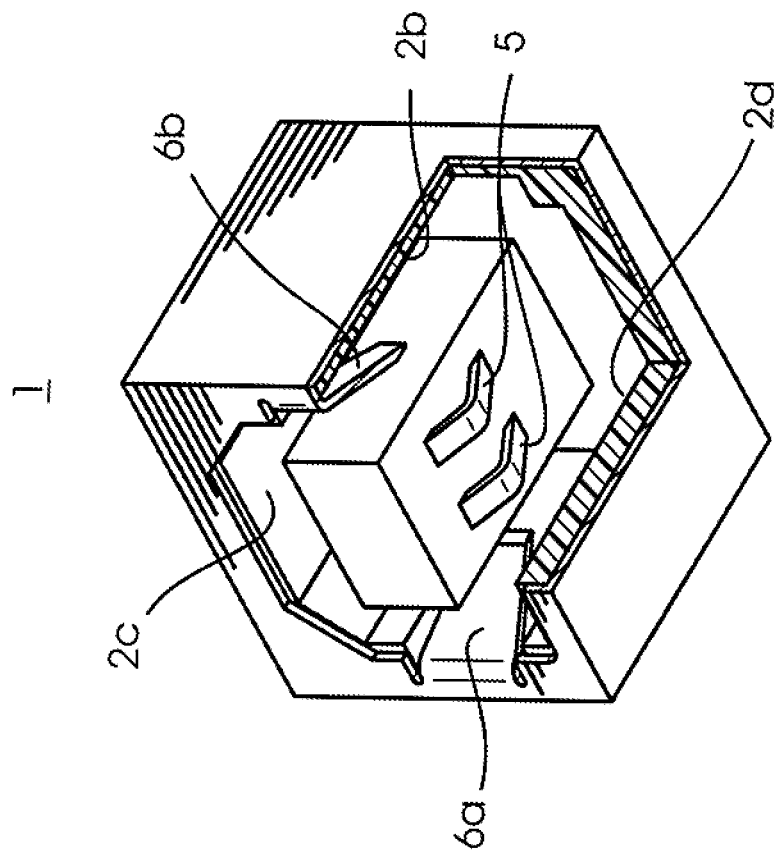
FIG. 4 is a schematic perspective view, partially cut away, of the conventional communication port as shown in FIG. 3.
Figure 3:
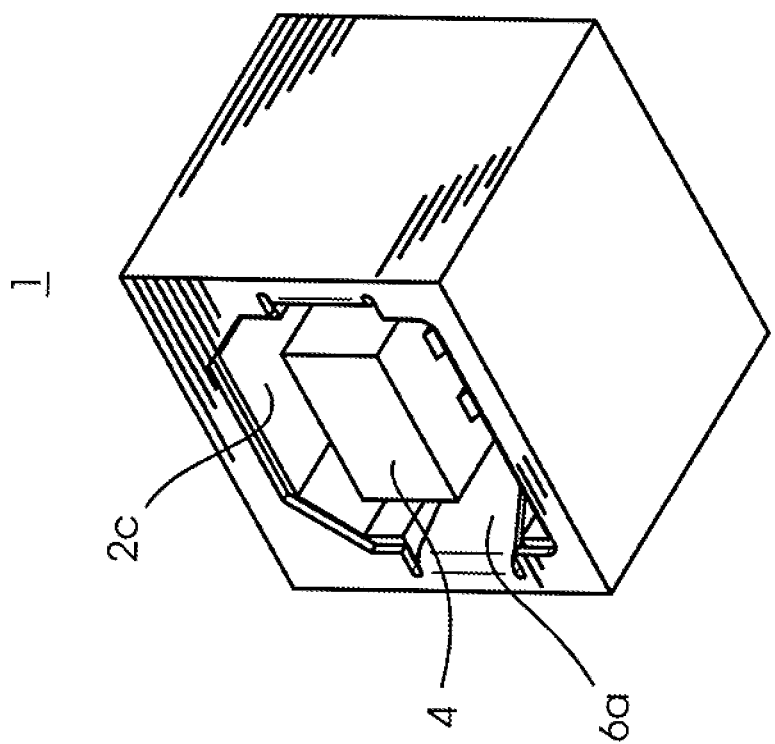
FIG. 3 is a schematic perspective view of the conventional communication port shown in FIG. 1, from a different viewing orientation.
Figure 5:
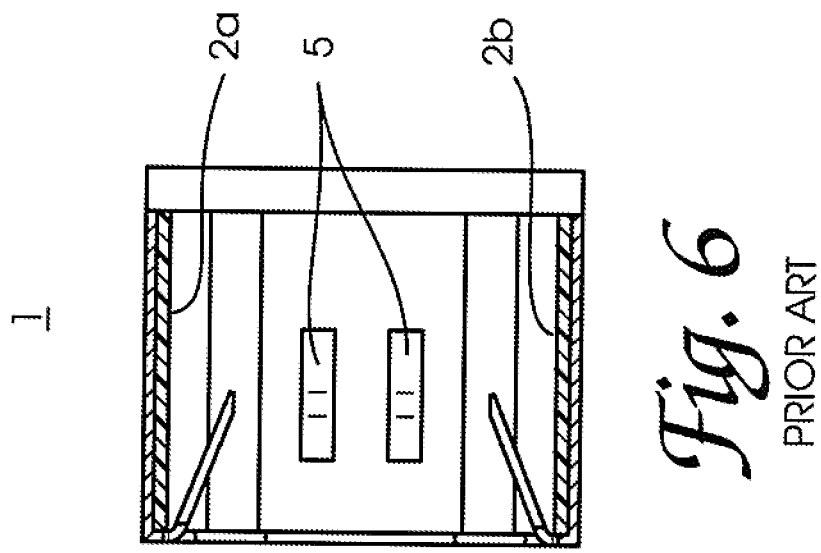
FIG. 5 is a schematic front elevational view of the conventional communication port shown in FIG. 1.
Figure 6:
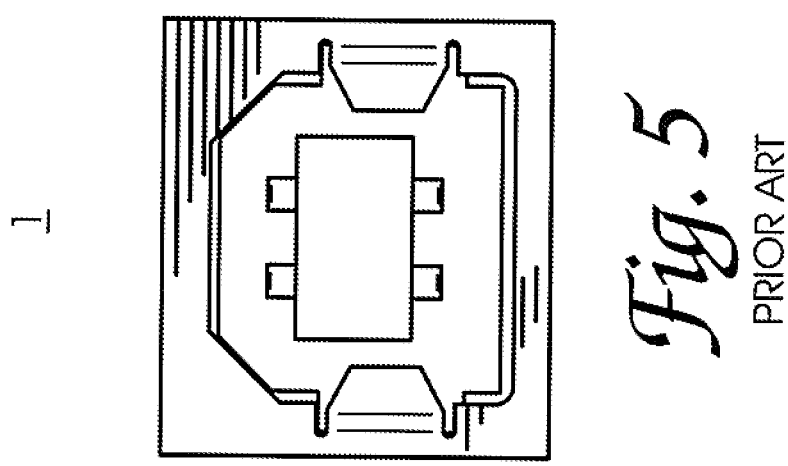
FIG. 6 is a sectional plan view of the conventional communication port shown in FIG. 1.

While the present invention may be embodied in various forms suitable for particular applications, there are shown in the accompanying drawings and described in illustrative detail herein specific embodiments which exemplify the principles of the invention as implemented for certain illustrative applications. It is to be understood that this collective disclosure is meant to be illustrative and exemplary, and is not intended to limit the invention to what is illustrated and described herein.

Briefly, the present invention is directed to a port protector which may be employed for locking insert into communication ports variously provided on electronic equipment known in the art. These communication ports typically form receptacles for connectors which terminate cables and other such transmission media which are kept openly exposed when not in use. A port protector formed in accordance with one exemplary embodiment of the present invention provides various levels of protection for such communication ports. At a base level, the port protector inserts into and substantially plugs an otherwise openly exposed receptacle of a communication port until it is ready for use. This guards against unauthorized interconnection with the communication port and infiltration of dust or other foreign debris in the meantime.

Once it is positioned to engage a communication port, the port protector provides additional levels of protection. As illustratively described and shown herein, the port protector is configured to so engage the given port that it is locked in retentive engagement with the communication port without need for other extraneous components to lock the port protector in place. It is "self-locking" in this regard, and remains substantially unlockable unless it is either destructively disassembled or suitably disarmed as provided herein, either of which would leave obvious evidence of tampering (be it authorized or not).

The port protector preferably provides a further level of protection by making it difficult to disguise an unauthorized replica of a properly authorized port protector originally installed in a given communication port. For example, if an originally installed port protector were to be forcibly removed then replaced with an unauthorized replica of the same, this would also be evident. Each port protector in certain embodiments and applications is applied with a seemingly randomized pattern of variously shaped visual indicia such as graphic marks, spots, speckles, or the like to define an apparent 'fingerprint' for that particular port protector.

The port protector is generally provided in practice for use as a single structural assembly, whose separable structural bodies are operably coupled and combine to form one package that may be conveniently handled in the field when deployed. That is, despite its multi-piece structure, the port protector may be pre-assembled so that users in the field need not fumble with multiple discrete components to join together, or to take added precautions to keep them from coming apart when installing. A user in the field may simply take such port protector in pre-assembled form and insert the same into a given communication port. Depending on the embodiment and application, the pre-assembled port protector may be inserted while already in its armed configuration, or alternatively while in its disarmed configuration then set to its armed configuration once properly seated within the communication port, to complete protective installation.

The port protector assembly preferably holds together, whether in its armed or disarmed configuration, to make for convenient handling and manipulation for proper installation into the given communication port. Except for a key or other member which may be removed from an armed port protector assembly for subsequent disarming, the separate but mutually engaged parts of the port assembly remain assembled together for convenient removal as one unit from the communication port.

More specifically, the port protector is equipped with built-in measures to enable convenient conversion from an armed/protecting configuration (in which it is adapted to maintain secure engagement with the given communication port) to a disarmed configuration (in which it is adapted to disengage and remain free for unobstructed release from the communication port). Preferably, the port protector may be installed on the communication port while holding its armed configuration. An onboard keying feature is provided which aids in holding the port protector in the armed configuration. The keying feature is subject to tamper evident user manipulation for releasing the hold and enabling the port protector's conversion to its disarmed configuration (when time comes for disengagement from the communication port). Retention features such as a resilient clipping structure incorporated in the port protector serve to then hold the port protector in this disarmed configuration so that the various mutually engaged parts may be readily removed as a whole from the communication port.

The port protector in different embodiments and applications may be suitably adapted in structure for the different types of communication ports employed by the given electronic equipment. Communication ports known in the art include data ports of various type, such as the so-called Universal Serial Bus (USB) data port of Type-B form which are widely used in the art. An example of such Type-B USB data port 1 is schematically illustrated in FIGS. 1-6. Although not shown, more than one Type-B USB data port 1 such as shown in FIGS. 1-6 may be employed in certain embodiments suitably arranged with respect to one another to accommodate the interconnection of various other equipment in telecommunications or other network communications applications.

Much as in other FIGS. referenced herein, the views shown in FIGS. 1-6 are simplified in the interests of brevity and clarity to show only those schematic details helpful for understanding certain features of the port protector as disclosed herein. While a representative Type-B USB data port is shown, this is but one example of a communication port 1 served by a port protector implemented in accordance with certain aspects of the present invention; and, the port protector may be suitably adapted in structural configuration for use with communication ports of other type or form known in the art without departing from the spirit and scope of the present invention as claimed.

Each communication port 1 is formed with a body that defines a receptacle/compartment 3 extending longitudinally inward from a front opening as shown. The body includes a first pair of opposed walls 2a, 2b disposed across from one another along a first transverse direction (such as a lateral direction) relative to the longitudinal extension of the receptacle 3, and a second pair of opposed walls 2c, 2d opposing one another along a second transverse direction (such as a vertical direction) relative to the longitudinal extension of the receptacle 3. These walls 2a-2d combine to define and substantially encircle at least a portion of a generally rectangular, longitudinally extended receptacle 3. Although not fully shown, the communication port 1 is normally equipped with electrical, electro-optical, and/or other such communications interface measures provided within the receptacle 3 for suitable interconnection with a connector terminating a given cable or other transmission media. This includes for example a plurality of conductive spring clips 5 provided at top and bottom surfaces of a central substrate member 4 extending longitudinally from a back wall of the communication port 1 as shown in FIGS. 2 and 4-6.

Two of the transversely opposed walls 2a, 2b are formed respectively with retention members such as tabs 6a, 6b that are resiliently biased to protrude into the receptacle 3. Each of the retention members 6a, 6b forms a firm yet elastic leaf spring structure for releasable latching engagement by or with a suitably mated engagement member or structural feature provided on a given connector that is suitably positioned within the receptacle 3.

Figure 7:
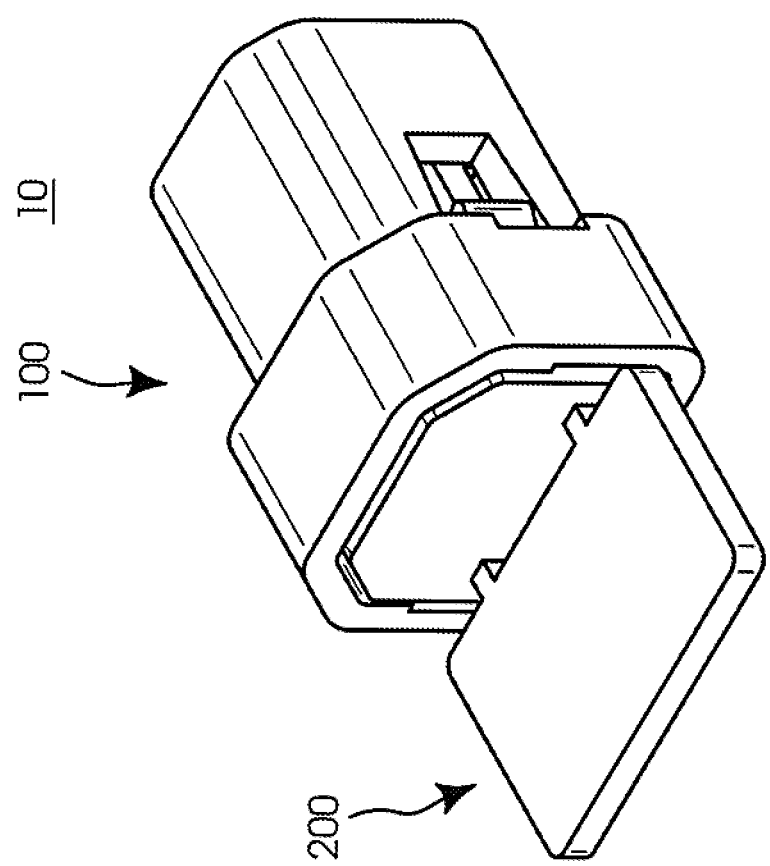
FIG. 7 is a perspective view of a port protector formed in accordance with one exemplary embodiment of the present invention, as assembled in an armed configuration for protecting installation into a communication port and viewed from a forward-down viewing orientation.

Turning to FIGS. 7-7F, there are shown various views illustrating a port protector 10 formed in accordance with one exemplary embodiment of the present invention. The port protector 10 is configured for self-locking insert into a locking, or protecting, position of a communication port 1 of a given piece of electronic equipment. In accordance with certain aspects of the present invention, the port protector 10 is disarmable for release from the communication port 1. It may be reconfigurable between a protecting configuration and a disarming configuration, and is equipped with onboard disarming measures which enable convenient yet tamper evident conversion to the disarming configuration without need for extraneous tools. The port protector 10 thus provides for secure locking insert into a communication port 1, which may be readily released by such tamper evident disarmament for removal when the communication port 1 is ready to be utilized.

Figure 8:
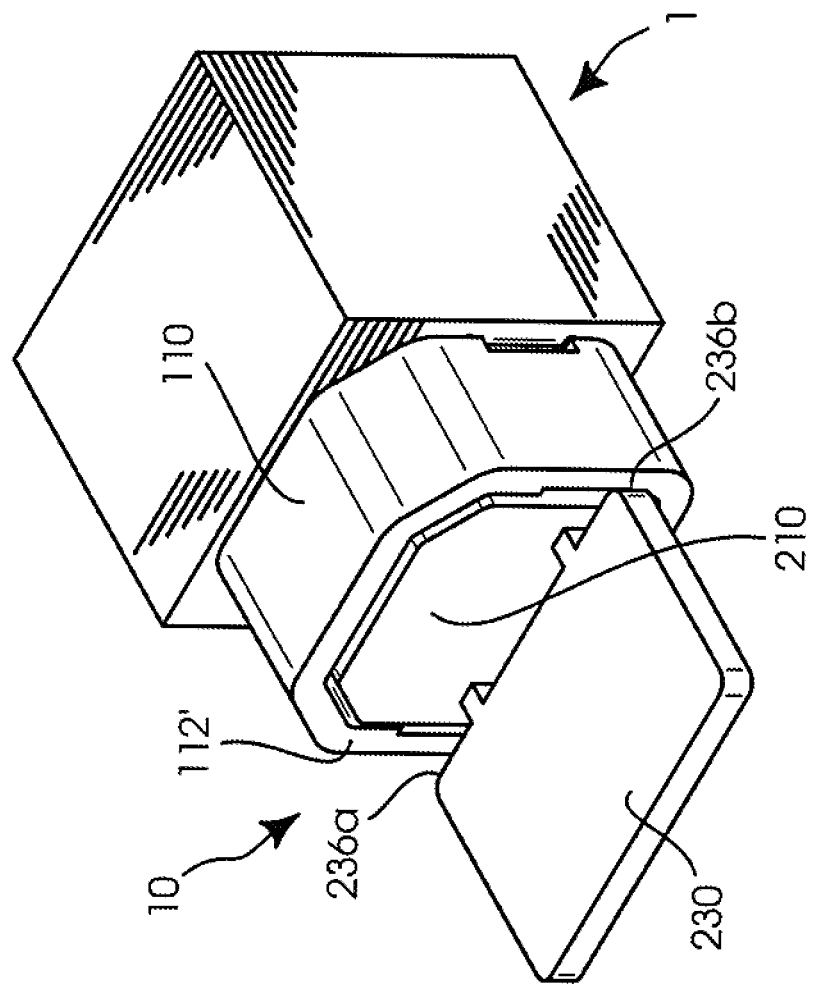
FIG. 8 is a perspective view of the embodiment shown in FIG. 7 as assembled in an armed configuration, and illustratively installed at a locked position in a conventional communication port, as viewed from a forward-down viewing orientation.
Figure 8A:
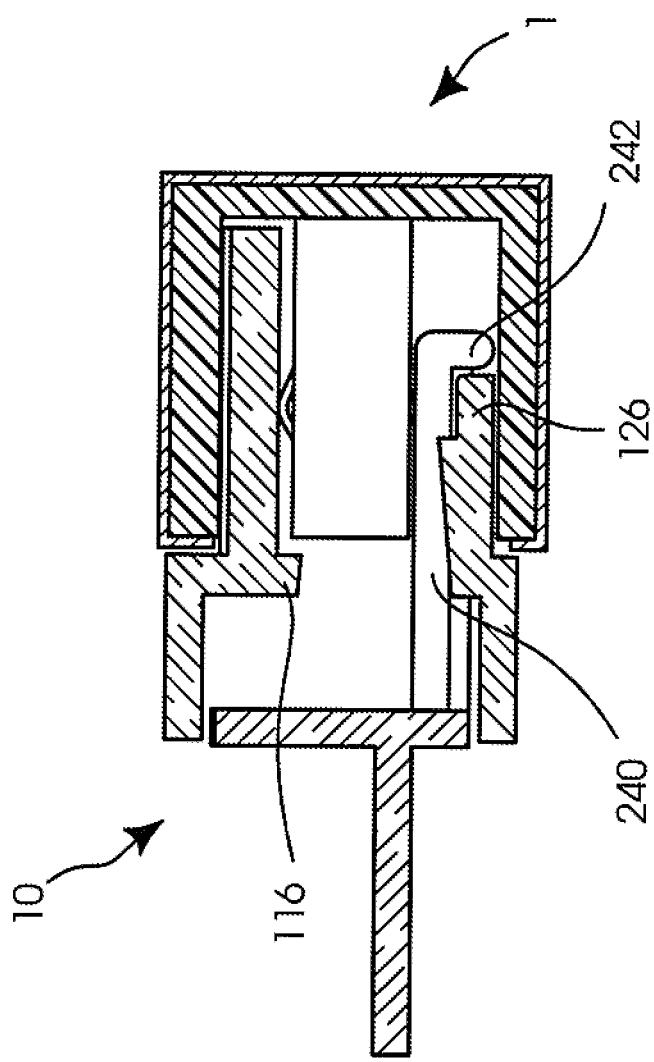
FIG. 8A is a sectional side view of the embodiment as shown in FIG. 8 installed in the conventional communication port.
Figure 8E:
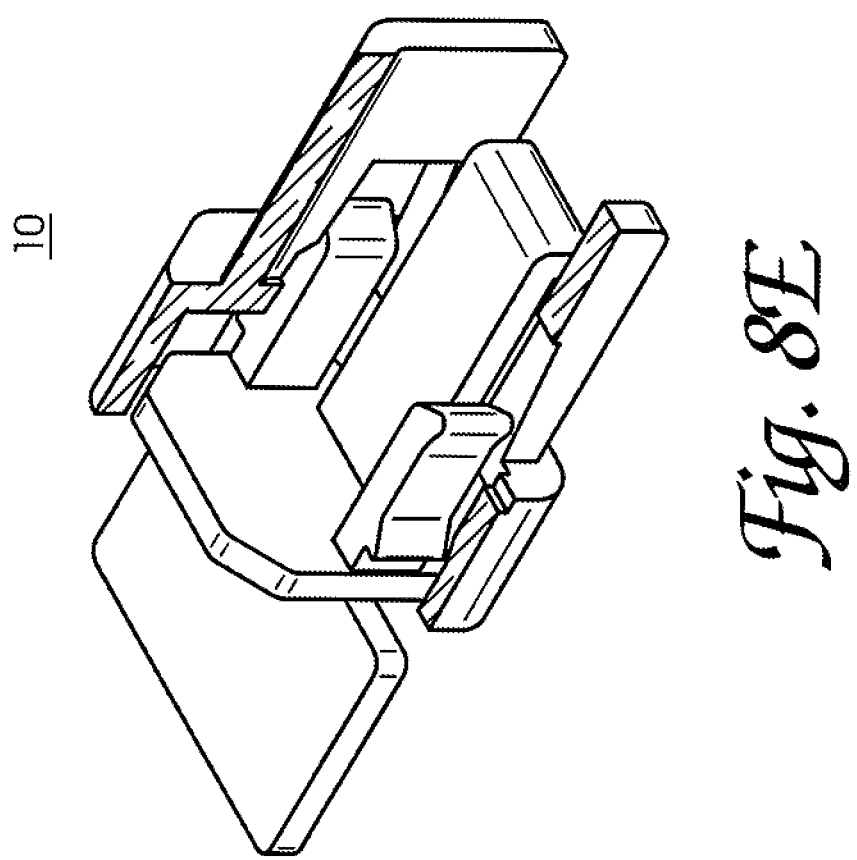
FIG. 8E is the perspective view, partially cut away, of the embodiment as shown in FIG. 7A.
Figure 10:
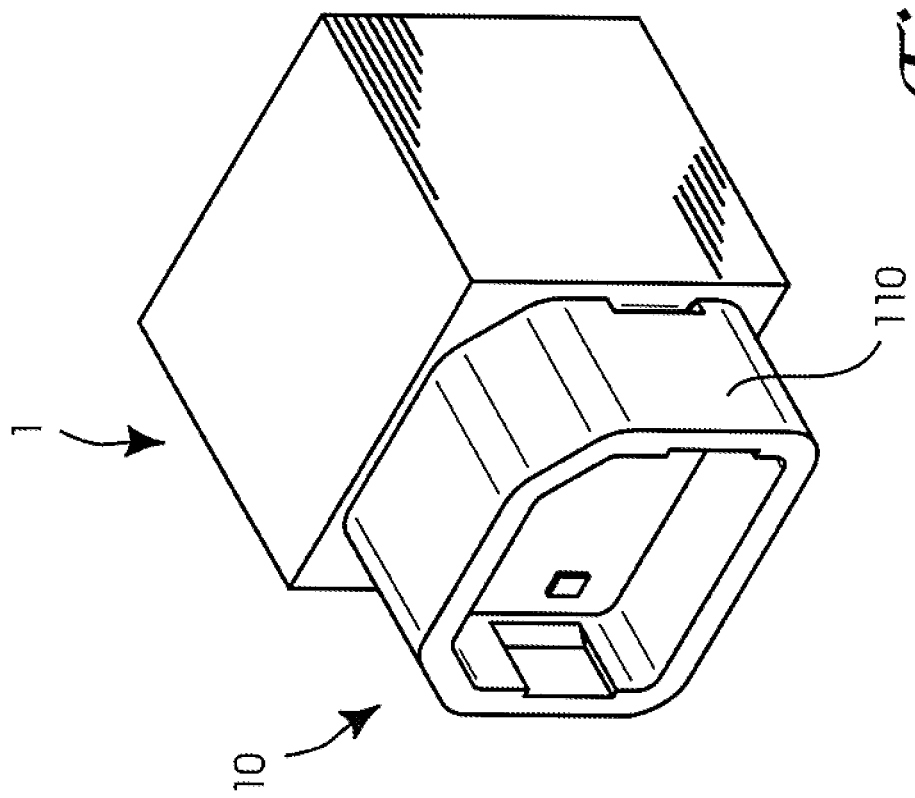
FIG. 10 is the perspective view of the installed embodiment as shown in FIG. 9, but disposed in the disarming configuration thereof.
Figure 10B:
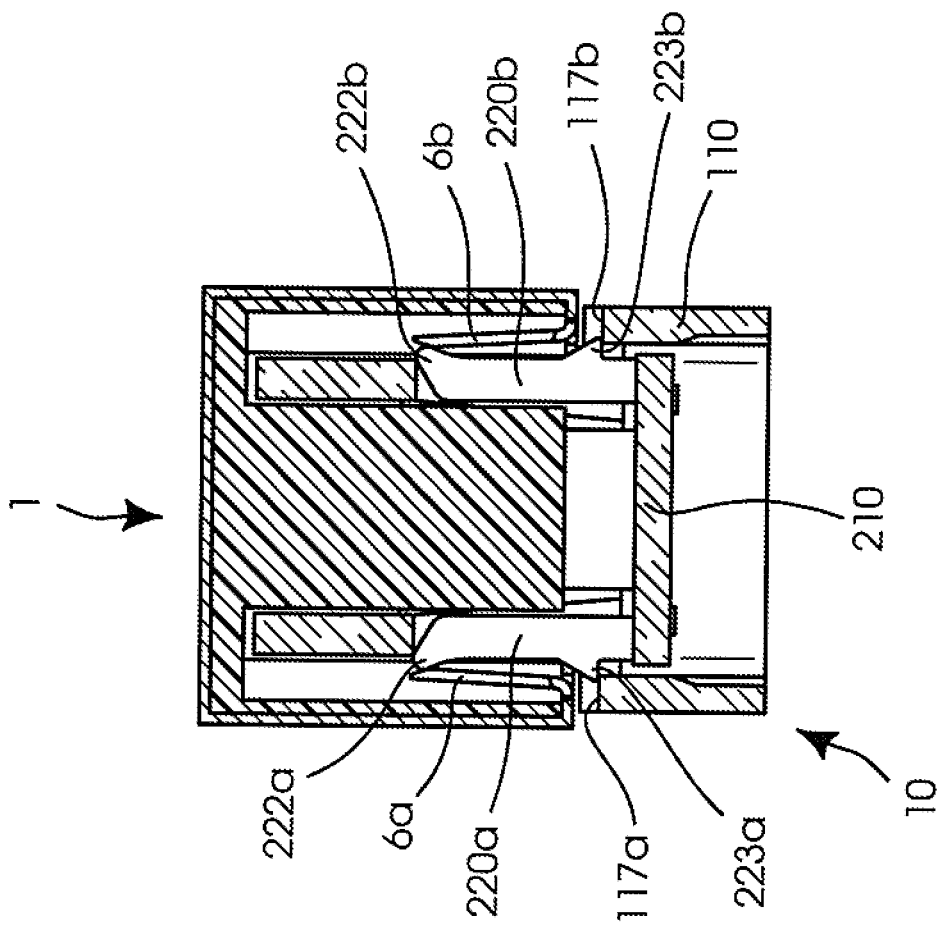
FIG. 10B is a sectional plan view of the installed embodiment as shown in FIG. 10 in the disarming configuration thereof.
Figure 10C:
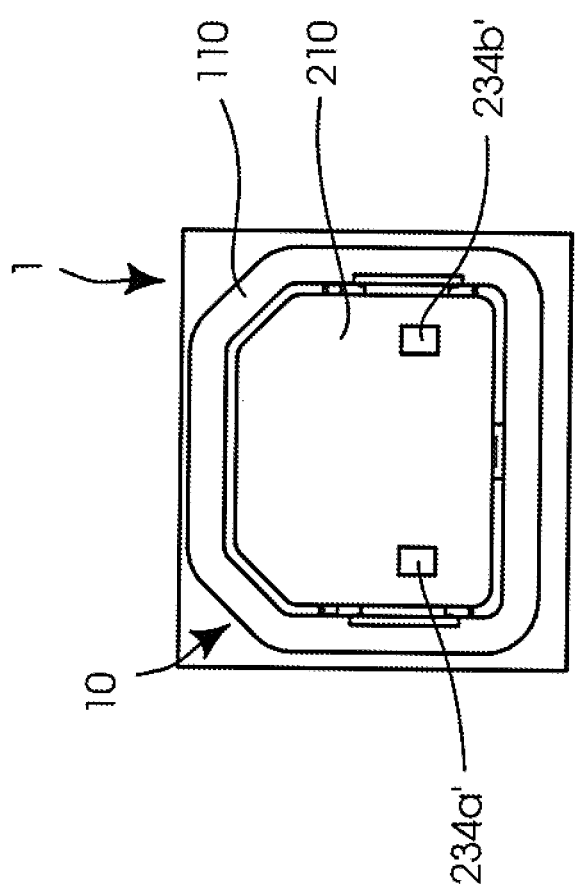
FIG. 10C is a front elevational view of the installed embodiment as shown in FIG. 10 in the disarming configuration thereof.

In the exemplary embodiment shown, the port protector 10 generally includes a lock body 100 and a key body 200 which are coupled together for field deployment. The lock body 100 is configured to retentively engage the communication port 1 when disposed at a locking position relative thereto. The key body 200 is coupled to the lock body 100 in displaceable manner, such that it is displaceable from at least a protecting position relative to the lock body (such as illustrated in FIGS. 8-8E) to a disarming position relative to the lock body (such as illustrated in FIGS. 10-10C). At the protecting position, the key body 200 is releasably locked in place preferably by a resilient clipping or other snap-fit engagement which may be overcome by forcibly depressing the key body 200 to advance sufficiently into the lock body 100.

But a keying portion 230 provided on the key body 200 extends suitably outward to bear against the lock body 100 and stop the body's advancement beyond a certain limit. It is only when the keying portion 230 is at least partially detached or conspicuously distorted/disfigured otherwise, to remove its stopping engagement against the lock body 100, that the key body 200 is cleared for fuller advancement into the lock body 100 to its disarming position. The key body 200 is again resiliently clipped or snap-fit engaged to the lock body 100 there, for convenient removal therewith as one unit from the communication port 1.

Turning more closely to the lock body 100, the body includes an interface portion 110 and an engagement portion 120 extending longitudinally therefrom. When the lock body 100 is disposed at the locking position on the communication port 1, its engagement portion 120 is at least partially inserted into the receptacle 3 of that communication port 1. The engagement portion 120 defines an engagement chamber 121 having an open terminal end through which it receives a substrate member 4 projecting longitudinally from the communication port 1. The engagement portion 120 further defines transverse walls 122a, 122b each formed with at least one transverse window openings 124a, 124b bounded by respective sill surfaces 124a', 124b'. The transverse window openings receive the retention members 6a, 6b projecting transversely from the communication port 1 when the engagement portion is disposed in the locking position-whereby the lock body 100 is locked against removal from the communication port 1. The engagement portion 120 is preferably formed with an outer surface contour sufficient for suitably stable engagement of the receptacle 3 defined by the given communication port 1.

The interface portion 110 of the lock body 100 is configured to receive and pass portions of the key body 200 therethrough, into the engagement portion 120. The interface portion 110 is also configured to engage parts of the key body 200 to releasably lock the key body 200 in each of its alternative protecting and disarming positions relative to the lock body 100. The interface portion 110 includes an inner surface 114 defining an interface chamber 115 in open communication with the engagement chamber 121 of the engagement portion 120. The interface portion 110 defines forward-facing and rearward-facing edge surfaces 112, 112' peripherally bounding the interface chamber.

The interface portion 110 is preferably equipped with suitable measures for locking against one or more parts of the key body 200 in releasable manner to serve as entry and exit guards 113a, 113b and 117a, 117b. In the illustrated embodiment, for example, the interface portion 110 is provided with entry guards 113a, 113b preferably formed as recesses in the inner surface 114 which are at least partially ramped in contour, such as defined by the ramped sections 113a', 113b' shown. These entry guards 113a, 113b serve as guiding and stopping surfaces against which suitable disarming members of the key body 200 resiliently bear when the key body 200 is advanced into the engagement section 120 to its protecting position (relative to the lock body 100). It is there that the key body 200 resides until this stopping engagement is overcome by application of sufficient driving force to drive the key body 200 further into the engagement section 120 to its disarming position (relative to the lock body 100).

The interface portion 110 is also provided in the illustrated embodiment with exit guards 117a, 117b preferably formed as recesses or cutouts in parts of the inner surface 114 disposed further downstream towards the engagement section 120. The exit guards 117a, 117b allow the space for the resilient disarming members of the key body 200, after having been squeezed and advanced well past the entry guards 113a, 113b to clear the intermediate section of the interface portion 110, to spring back outward. The disarming members at that point engage the exit guards 117a, 117b, thereby catching against the intermediate section of the interface portion 110 they just cleared. The key body 200 is thus stopped against withdrawal from the engagement section 120 of the lock body 100.

The key body 200 includes a base portion 210 and a disarming portion 220 extending longitudinally in a forward direction from the base portion 210. The key body 200 also includes a keying portion 230 extending in a rearward direction from the base portion 210 for stopping engagement of the lock body 100 when in the protecting position. The key body 200 further includes in the illustrated embodiment a tongue portion 240 extending longitudinally forward from the base portion 210 for retentively engaging the lock body 100 when in that protecting position.

The base portion 210 of the key body 200 preferably forms a shield structure extending transversely across the interface chamber 115 to substantially block open access therethrough when the key body 200 is placed in its protecting position relative to the lock body 100. The base portion 210 is sized and positioned on the lock body's interface portion 110 to minimize any space/clearance that may remain peripherally thereabout. That is, the base portion 210 is formed to span substantially the full transverse width and height of the opening into the interface chamber 115, but may be adapted in configuration accordingly in alternate embodiments to suit various geometries of particular communication ports encountered in other applications.

The disarming portion 220 when in the disarming position disengages the lock body 100 from the communication port 1 so that it may be withdrawn from the locking position the lock body 100 had assumed therein. Before it may be displaced to the disarming position, however, the key body 200 must be first released from its protecting position. Release may be effected by displacing the keying portion 230 least partially relative to the base portion 210, which invariably leaves suitable tamper evident indication.

The keying portion 230 is preferably joined to the base portion 210 by at least one frangible coupling to extend longitudinally therefrom. More specifically, the keying portion 230 in the illustrated embodiment includes a key tab member 232 joined to the base portion 210 by a pair of frangible couplings 234a, 234b preferably formed as severable bridge-like structures. The tab member 232 is so configured that it peripherally overhangs the base portion 210, such as at its edges 236a, 236b which effectively define stopping surfaces that may bear against the lock body's interface portion 110 to limit the key body's advancement into that lock body 100 (so long as the keying portion 230 remains in place and undistorted). The tab member 232 in other embodiments and applications may be formed with other configurations to suit geometries for the lock body 100 different from that shown, such that it provides secure stopping engagement therewith when the key body 200 is in its protecting position.

The keying portion 230 may be released by partially or fully detaching the key tab member 232 from the base portion 210 by severing one or both of the frangible couplings 234a, 234b. Preferably, both frangible couplings 234a, 234b are severed to fully detach and remove the key tab member 232, thereby removing its peripherally overhanging stop against the lock body's interface portion 110. The base portion 210 is thus cleared for advancement past the opening of the interface portion 110, further into the lock body 100 towards the disarming position therein, when pushed inward by the user.

The key body 200 further includes a tongue portion 240 extending longitudinally from the base portion 210. The tongue portion 240 is suitably configured to retentively engage the lock body 100 upon the key body 200 reaching its protecting position therein. The tongue portion 240 is preferably formed to pass at least partially beneath the substrate member 4 of the communication port 1 when the port protector 10 is fully installed to its locking position in that communication port 1. The tongue portion 240 is suitably configured with respect to corresponding surfaces of the lock body's engagement portion 120 to latch thereagainst when the key body 200 is disposed at its protecting position relative to the lock body 100. The tongue portion 240 is then retained by the substrate member 4 of the communication port 1 latched against the engagement portion 120 when the entire port protector package 10, in turn, is disposed at its locking position relative to the communication port 1.

Figure 7B:
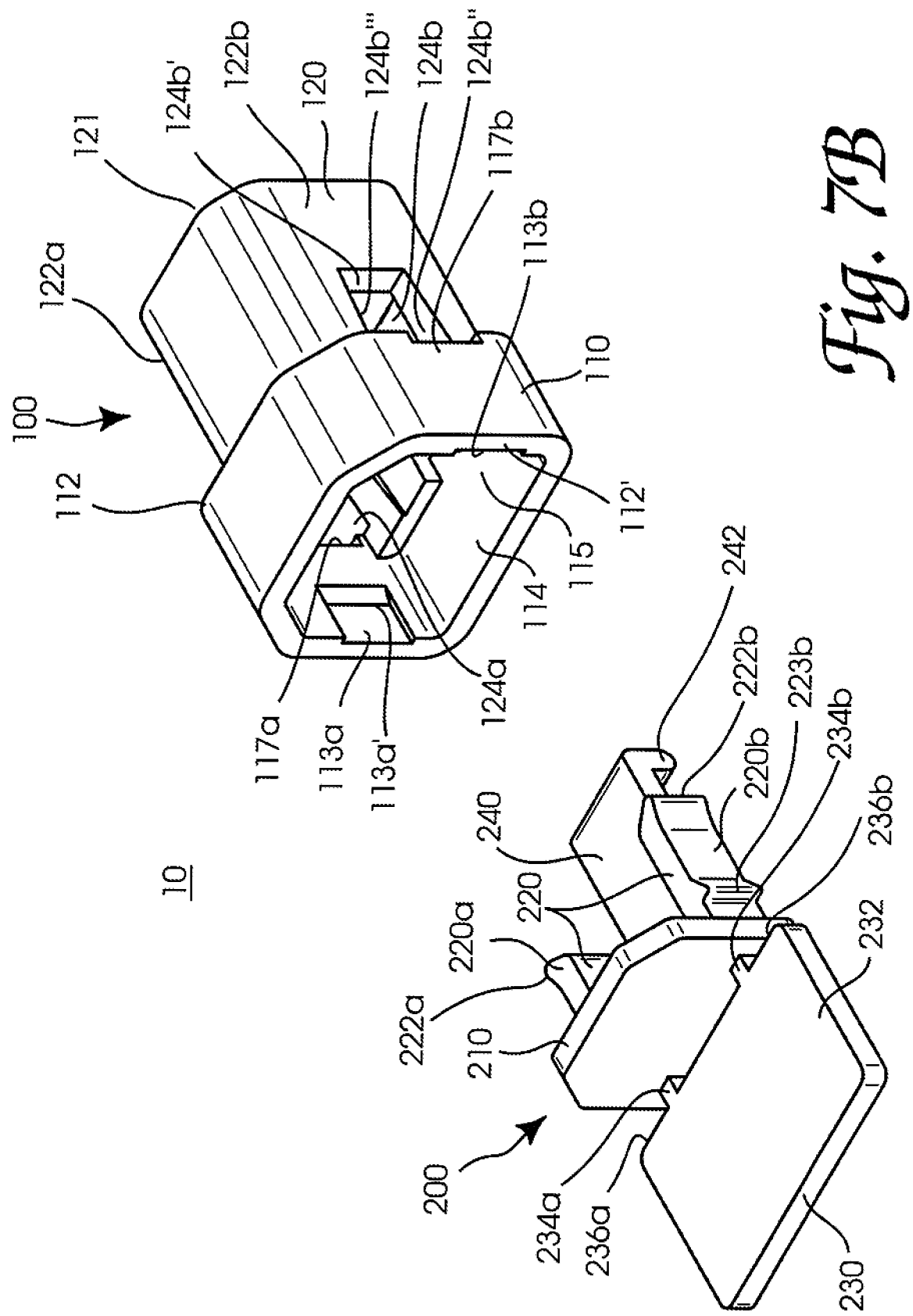
FIG. 7B is an exploded perspective view of the embodiment as shown in FIG. 7.
Figure 7E:
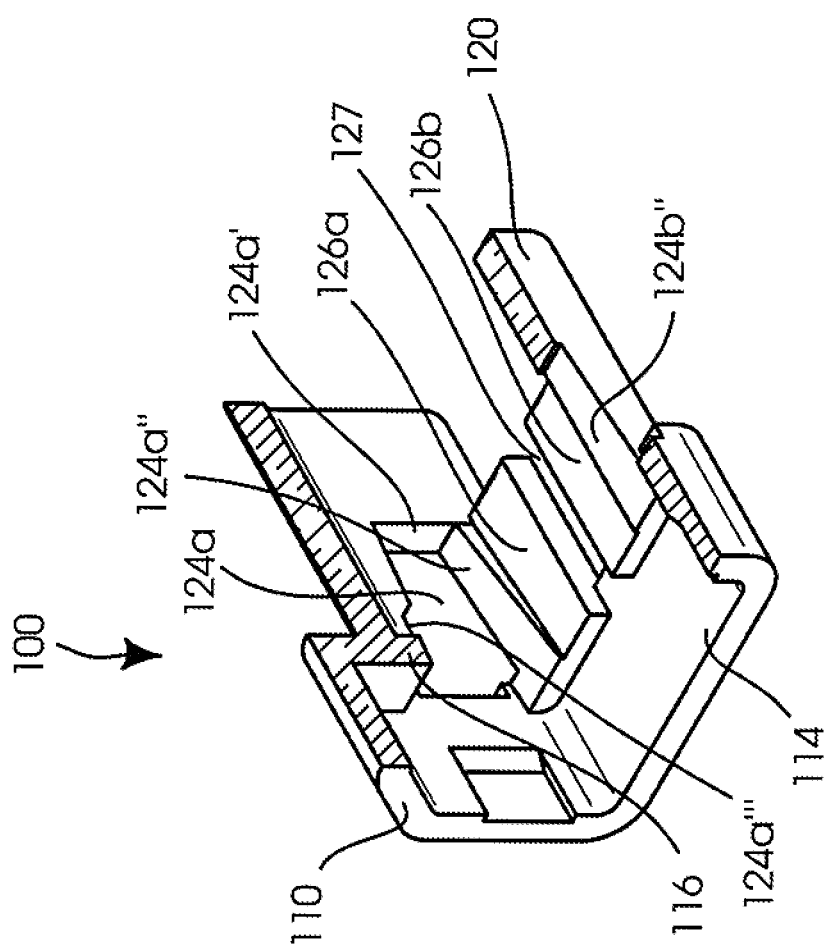
FIG. 7E is a perspective view, partially cut away, of a certain other isolated part of the embodiment shown in FIG. 7, from the forward-down viewing orientation.

As shown most clearly in FIGS. 7B and 7C (see also FIG. 8), the tongue portion 240 in the illustrated embodiment is formed with a hooking feature 242 at its terminal end. This hooking feature 242 is suitably configured to retentively engage a complementary feature 126 formed in the engagement portion 120 of the lock body 100. As illustrated in FIGS. 7D-7F, the tongue portion 240 may also be formed with other features, such as a skate feature 244 underneath to slidably engage a complementary track-like slot feature 127 defined by guide platforms 126a, 126b formed in the engagement portion 120 for guided longitudinal advancement into the engagement chamber 121 of the engagement portion 120 when the key body 200 is combined with the lock body 100.

Preferably, the guide platforms 126a, 126b are suitably configured to serve as both guide and support surfaces for the bottom surfaces of the tongue portion 240. In the embodiment shown, each guide platform 126a, 126b is disposed to run alongside a ramped sill surface 124a", 124b" of a transverse window opening 124a, 124b. Also in the embodiment shown, an upper sill surface 124a''', 124b''' opposing each ramped sill surface forms a cutout or notch that provides ample clearance for the disarming portion's arm-like actuating members 220a, 220b to enter into position within respective window openings 124a, 124b.

Figure 12:
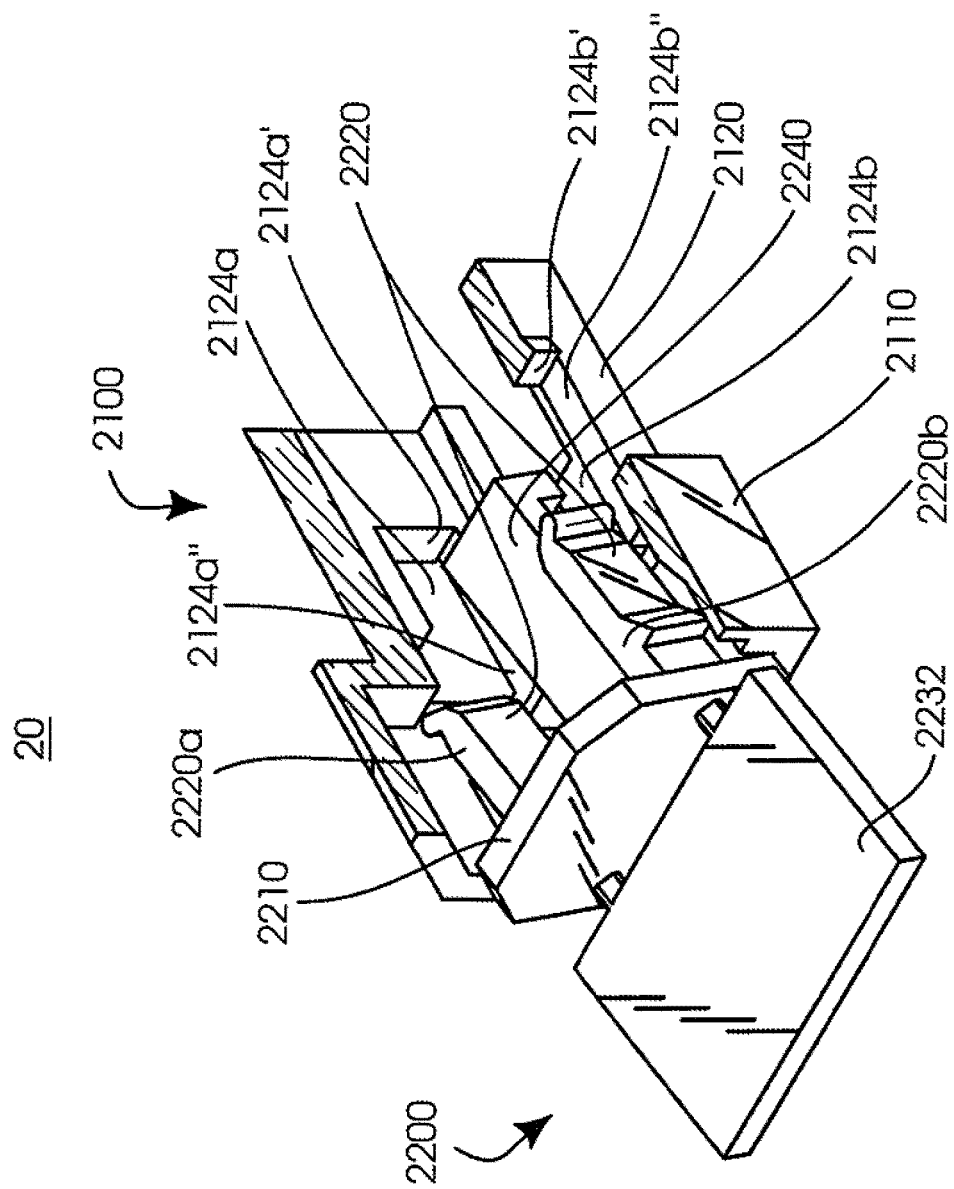
FIG. 12 is a perspective view, partially cut away, of a port protector formed in accordance with another exemplary embodiment of the present invention, shown during assembly to an armed configuration, viewed from a forward-down viewing orientation.
Figure 12A:
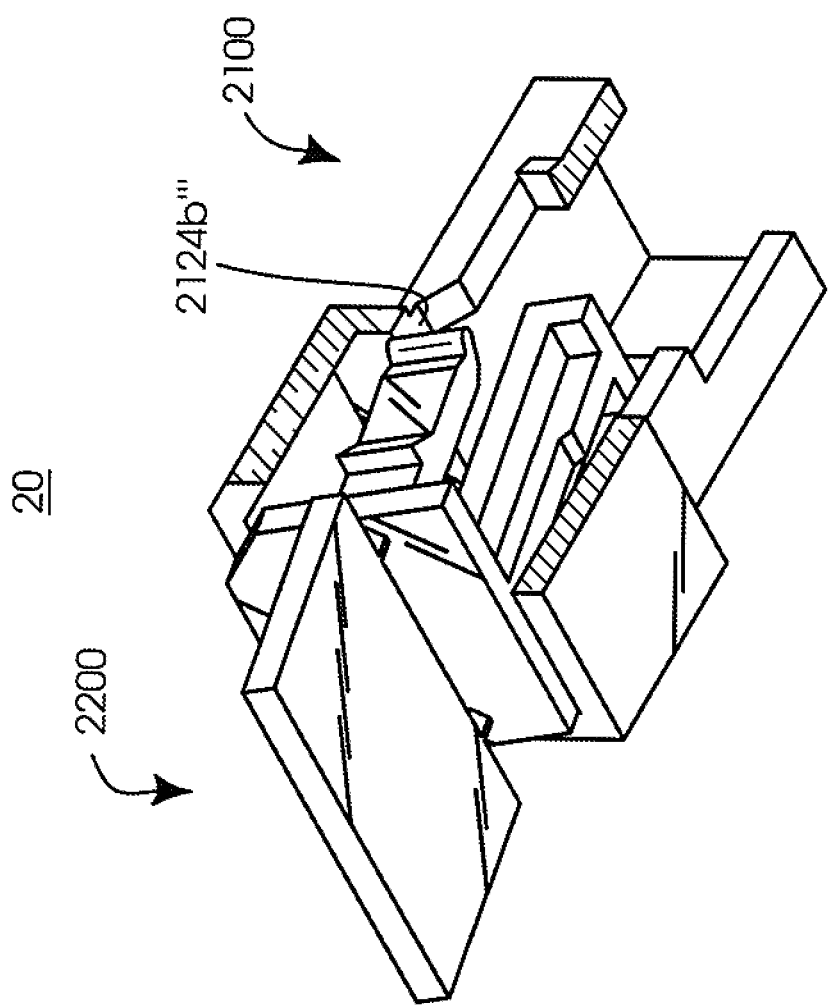
FIG. 12A is a perspective view, partially cut away, of the alternate embodiment as shown in FIG. 12 during assembly to an armed configuration, but viewed from a forward-up viewing orientation.
Figure 12E:
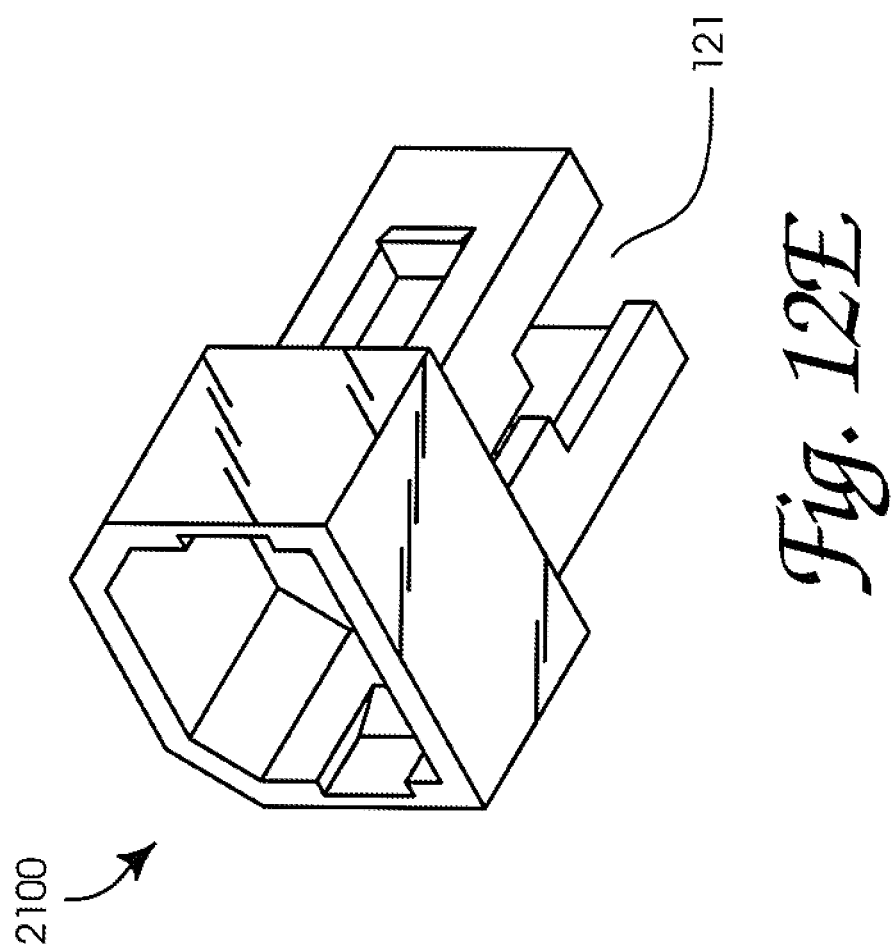
FIG. 12E is a perspective view of a certain other isolated part of the alternate embodiment as shown in FIG. 12C.
Figure 12F:
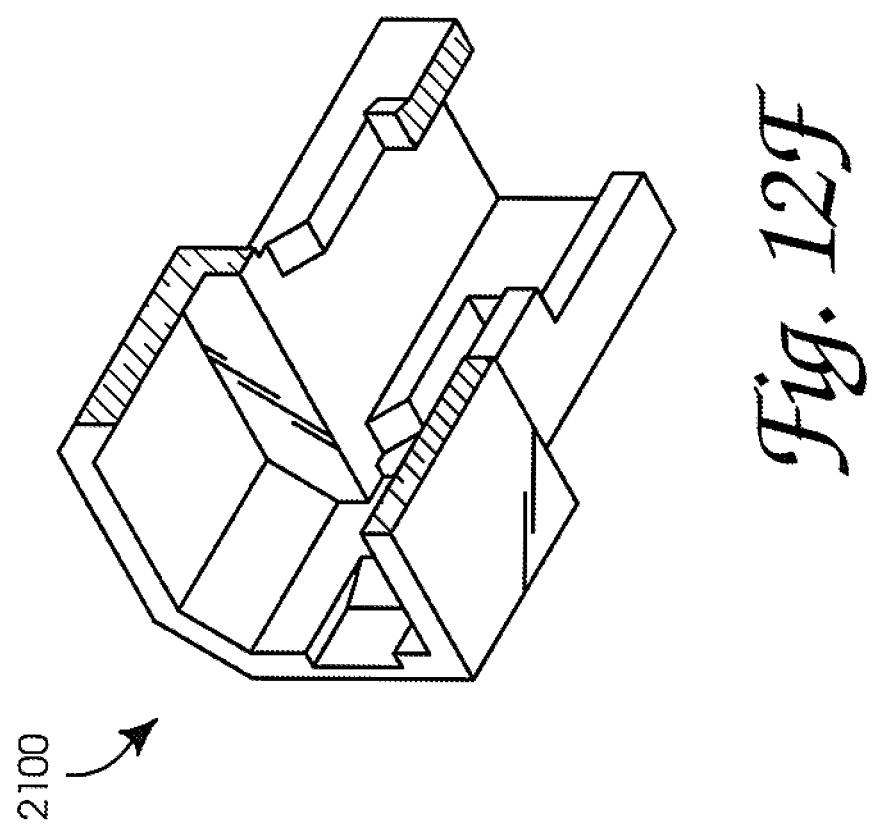
FIG. 12F is the perspective view, partially cut away, of the other isolated part of the alternate embodiment as shown in FIG. 12E.

Much as illustrated, for instance, in FIGS. 12-12A in connection with a certain alternate embodiment, when the key body 200 is assembled to the lock body 100 in this embodiment, it is tilted upward to ensure the forward parts of the disarming and tongue portions 220, 240 properly assume their initial protecting positions with respect to corresponding portions of the lock body 100. The lower ramped sill surface 124a", 124b" and upper notched sill surface 124a''', 124b''' provide the clearance space needed for the actuating members 220a, 220b to be manipulated in this upwardly tilted then leveled manipulation into protecting position engagement with their respective window openings 124a, 124b. Similarly, the guide platforms 126a, 126b and slotted feature 127 defined therebetween accommodate the tongue portion 240 and its bottom skate feature 244 as it is likewise manipulated into protecting position engagement therewith.

Referring now to FIGS. 8-8E, the key body 200 is shown assembled to the lock body 100 in its protecting position. The disarming portion 220 of the key body 200 includes a plurality of actuating members 220a, 220b which project from the base portion 210. Preferably, each actuating member 220a, 220b is formed in this embodiment with a sufficiently resilient arm-like configuration to deflect out of the way as it is forced further into the lock body 100 from the protecting position. Yet, each actuating member 220a, 220b is formed to be stiff enough to drive deflection of the communication port's retention member 6a, 6b out of the way as it advances into the lock body's engagement section 120 to a disarming position therein. Towards that end, each actuating member is preferably formed with a protuberant structure 222a, 222b at or near its free end which facilitates engaging contact with the surrounding surfaces of the lock body 100 and the retention member 6a, 6b of the communication port 1.

Each actuating member 220a, 220b is also formed with a clipping structure 223a, 223b configured at a forward face to bear against a ramped section 113a', 113b' of an entry guard 113a, 113b formed in the lock body's interface section 110 when the key body 200 is disposed in the protecting position. The clipping structure 223a, 223b of each actuating member 220a, 220b is configured at a rearward face to clip against an exit guard 117a, 117b formed in the lock body's interface section 110 when the key body 200 reaches its disarming position within the lock body 100. The clipping structures 223a, 223b thus serve to clip against the lock body 100 in resiliently biased manner to secure the disarmed configuration of the port protector assembly 10, when the key body 20 is disposed at this disarming position. Such disarmed configuration permits the port protector assembly's unobstructed removal as one unit from the communication port 1 for the port's subsequent use.

In FIGS. 8-8E, the port protector assembly 10 is shown installed to its locking position in the communication port 1. Some views are shown partially cut away for clarity of illustration. For operational use of the communication port 1, a matching connector (not shown) would be inserted into the receptacle 3 for mated engagement with the communication port 1, deflecting the retention members 6a, 6b as it advances until they 'click in' to retentively engage respective window openings formed on the connector. A port protector 10 is inserted in much the same manner into the receptacle 3, as shown, in order to protect and secure the communication port 1 until it is ready for operational use with such matching connector.

With the port protector assembly 10 installed to its locking position on the communication port 1, with its key body 200 at the protecting position relative to the lock body 100. The overhanging edges 236a, 236b of the tab member 232 extend beyond the key body's base portion 210 to project transversely across the rearward-facing edge surface 112' of the lock body's interface section 110. The overhanging edges 236a, 236b are positioned there as stops against the edge surface 112' in the event of the key body's excessive advancement into the lock body 100 beyond this protecting position.

As also shown, when the port protector assembly 10 is installed in this locking position, the retention member 6a, 6b of the communication port 1 are sufficiently aligned with the window openings 124a, 124b of the lock body's engagement portion 120 to obstructively extend into the same, due to their leaf spring-like resilient bias. The retention members 6a, 6b thus encroach the window openings 124a, 124b for stopping engagement of the sill wall surfaces 124a', 124b', so as to block withdrawal of the lock body 100 from its locking position within the communication port 1.

Note that in this position, forward-facing surfaces clipping structures 223a, 223b of the key body's actuating members 220a, 220b merely rest against the ramped sections 113a', 113b' of the lock body's entry guard recesses 113a, 113b. The clipping structures 223a, 223b have not advanced far enough into the lock body 100 at this point to engage the same yet to serve its clipping function for disarmament purposes.

Similarly, the protuberant tips 222a, 222b of the actuating members 220a, 220b may have reached the lock body's transverse window openings 124a, 124b, but at most rest against the retention members 6a, 6b which may be encroaching the window openings there. The actuating members 220a, 220b have not advanced far enough into the lock body 100 at this point to serve its deflection driving function for disarmament purposes.

Figure 9C:
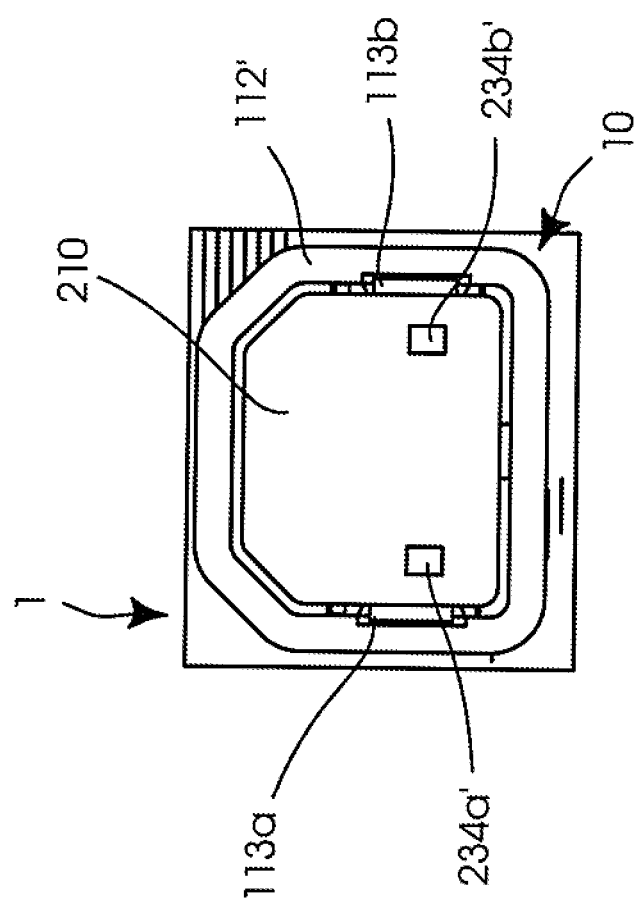
FIG. 9C is a front elevational view of the embodiment as shown in FIG. 9 installed in the conventional communication port and prepared for disarming reconfiguration.

Turning to FIGS. 9-9C, the port protector assembly 10 is shown in these views prepared in tamper evident manner to be disarmed. The key body's tab member 232 in this case has been detached and removed out of the way from its blocking/stopping position outside the lock body 100, by severing both of the frangible couplings 234a, 234b. In other applications and embodiments one or neither frangible coupling may not actually be severed, but otherwise distorted in tamper evident manner to permit the tab member 232 to be moved out of the way enough for base portion 210 to advance into the lock body's interface chamber 115. The frangible couplings 234a, 234b may be formed with any known material and configured with any known geometric features suitable for the intended application. The frangible couplings 234a, 234b are preferably of such suitable structure and material that the distortion or destruction required for moving the tab member 232 sufficiently out of the way to disarm the port protector 10 leaves conspicuous evidence of tampering, such as visibly stretched or bent sections, exposed jagged ends, or the like.

In any event, both the absence of the tab member 232 and the residual stubs 234a', 234b' of the frangible couplings make for highly conspicuous evidence tampering in order to free (or 'unlock') the port protector package 10 from its protecting configuration. At this point, the remnants of the key body 200 (minus the tab member 232) are displaceable relative to the lock body 100, which still remains in its locked position within the communication port 1, caught in place by the obstructively encroaching retention members 6a, 6b bearing retentively against the lock body's sill surfaces 124a', 124b' through the transverse window openings 124a, 124b. More specifically, the remnants of the key body 200 are shown in these views just beginning to advance further into the lock body 100 responsive to a driving force (applied longitudinally inward towards the lock body 100 upon the shield-like base portion 210).

At this point, the key body's actuating members 220a, 220b are each slightly deflected transversely inward (laterally in the views shown) by the forward-facing surfaces of the clipping structures 223a, 223b slidably advancing along the ramped sections 113a', 113b' of the lock body's entry guard recesses 113a, 113b. The protuberant tips 222a, 222b of the actuating members 220a, 220b begin to press against the retention members 6a, 6b which have breached the lock body's transverse window openings 124a, 124b and remain diagonally crossing their paths.

Next, in FIGS. 10-10C, the port protector assembly 10 is shown placed fully into its disarmed configuration by driving the remnants of the key body 200 further into the lock body 100, and in the process unlocking the lock body 100's retention within the communication port 1. That is, the key body's actuating members 220a, 220b are deflected transversely inward enough to advance longitudinally through and beyond the lock body's interface portion 110 to enter the engagement portion 120. As the actuating members' clipping structures 223a, 223b are advanced beyond the ramped sections 113a', 113b', they engage the inner surface 114 at thicker parts of the interface portion 110. This causes the actuating members 220a, 220b to deflect transversely inward, adding resistance to the key body 200 that is pressed further towards the lock body's engagement section 120. When the actuating members 220a, 220b are advanced far enough that their clipping structures 223a, 223b clear the interface portion 110 and reach the exit guards 117a, 117b, they are freed to deflect transversely outward again. Whereupon, the rearward-facing surfaces of the clipping structures 223a, 223b are sprung into engagement of the exit guards 117a, 117b to latch the remnants of the key body 200 to the lock body 100.

The actuating members 220a, 220b at this point have been driven far enough into the lock body 100 that their protuberant tips 222a, 222b have advanced along the retention members 6a, 6b to deflectively push them completely out of obstructive engagement with the lock body's transverse window openings 124a, 124b. The actuating members 220a, 220b are preferably configured in this embodiment such that their protuberant tips 222a, 222b are also stopped against the lock body's sill surfaces 124a', 124b'. This prevents any 'overshoot' advancement which might otherwise permit the retention members 6a, 6b to spring back and obstructively re-encroach a portion of the window openings 124a, 124b.

Figure 11A:
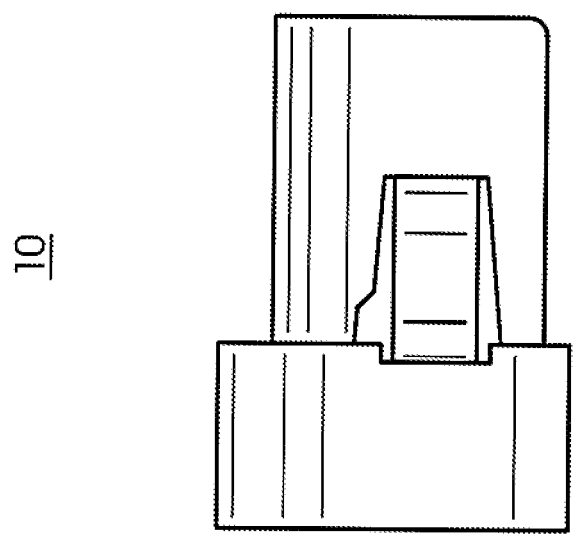
FIG. 11A is a side elevational view of the embodiment as shown in FIG. 11 in the disarming configuration thereof and removed from the conventional communication port.
Figure 11:
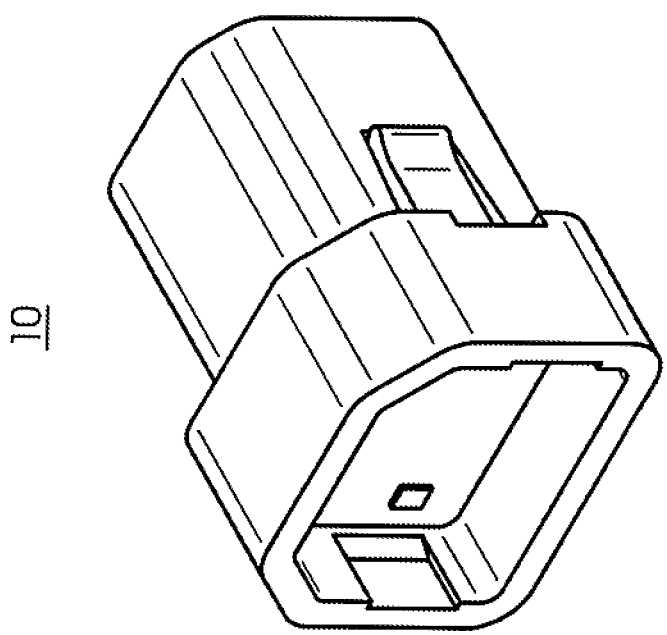
FIG. 11 is the perspective view of the embodiment as shown in FIG. 10 in the disarming configuration thereof, but removed from the conventional communication port.
Figure 11C:
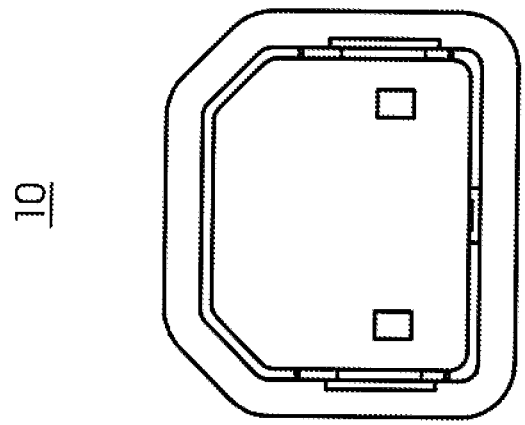
FIG. 11C is a front elevational view of the embodiment as shown in FIG. 11 in the disarming configuration thereof and removed from the conventional communication port.
Figure 11B:
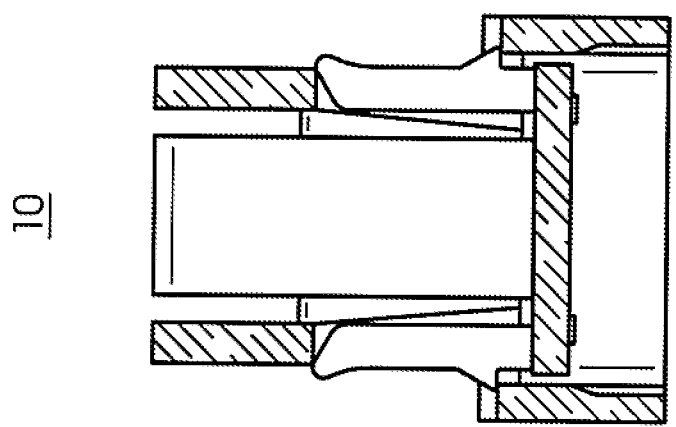
FIG. 11B is a plan view, partially cut away, of the embodiment as shown in FIG. 11 in the disarming configuration thereof and removed from the conventional communication port.

With the communication port's retention members 6a, 6b thus pushed out of the way as shown, the lock body 100 is no longer obstructed against removal from its locking position in that communication port 1. The port protector 10 is disarmed in this manner and compressed neatly to a package whose multiple bodies 100, 200 are latched together for convenient removal from the communication port 1. The resulting package may then be easily removed as one unit by grasping the interface portion 110 which remains accessible to the user outside the communication port 1. FIGS. 11-11C illustrates the port protector 10 disarmed and removed from the communication port 1 in this compressed unitary package.

Figure 12G:
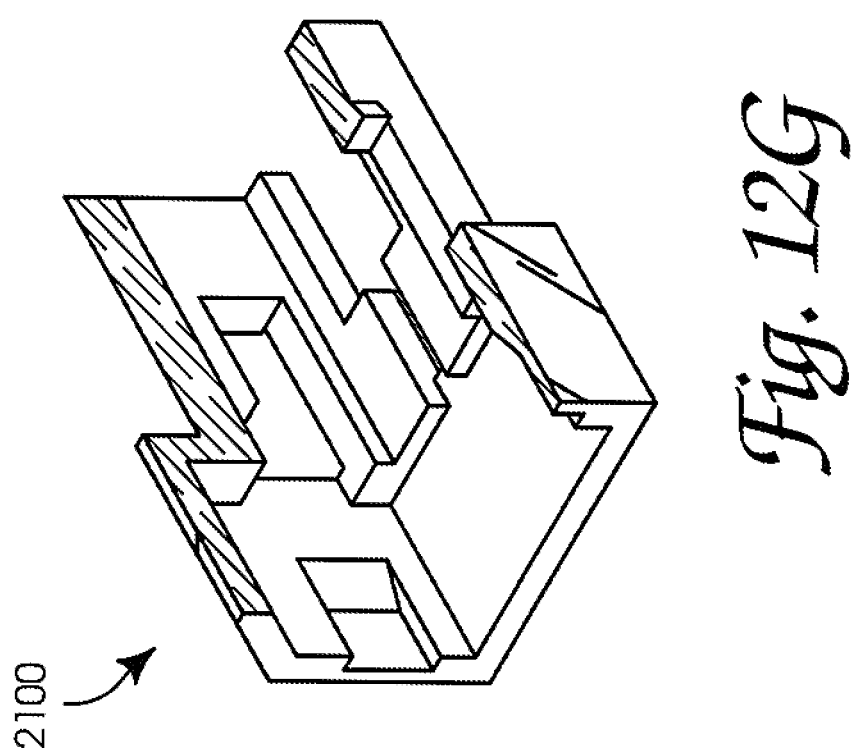
FIG. 12G is another perspective view, partially cut away, of the other isolated part of the alternate embodiment shown in FIG. 12E, as viewed from a forward-down viewing orientation.

FIGS. 12-12G illustrate a port protector 20 formed in accordance with an alternate embodiment of the present invention. This embodiment is similar to the embodiment illustrated in FIGS. 7-11C, except in several minor respects. The lock and key bodies 2100, 2200, for example, are formed with less rounded edges. The lock body 2100 in this embodiment is also formed with a somewhat simpler structure than in the preceding embodiment, yet provides sufficient clearance for the upwardly tilted then leveled insertion and seating of the key body 2200 into protecting position, as engaged to the lock body 2100. As shown in FIGS. 12, 12A, the key body 2200 is tilted so that the leading free end of the key body's tongue portion 2240 may be inserted upwardly then substantially leveled and advanced longitudinally inward in and through the mouth of the lock body's interface portion 2110 and into its engagement portion 2120. The actuating members of the key body's disarming portion 2220 are likewise inserted upwardly into then tilted back for leveled advancement longitudinally inward through the mouth of the lock body's interface portion 2110 and into its engagement portion 2120.

This port protector assembling action may be carried out much as with the preceding embodiment. In the preceding embodiment, the lower sill surfaces 124a", 124b" of the lock body's transverse window openings 124a, 124b are ramped to ensure sufficient space for the actuating arms 220a, 220b to clear the bulkhead extension 116 formed in the lock body's interface portion 110 during this assembling action. In the embodiment of FIGS. 12-12C, the inner surfaces of the interface portion 2110 and the transverse window openings 2124a, 2124b are so configured that the lower sill surfaces 2124a", 2124b" of the lock body 2100 need not be ramped to accommodate entry and seating of the key body's actuating arms 2220a, 2220b therein at the protecting position. Nor would the upper sill surfaces 2124a''', 2124b''' need to be ramped or sloped in order to ensure sufficient clearance in this regard.

Figure 13:
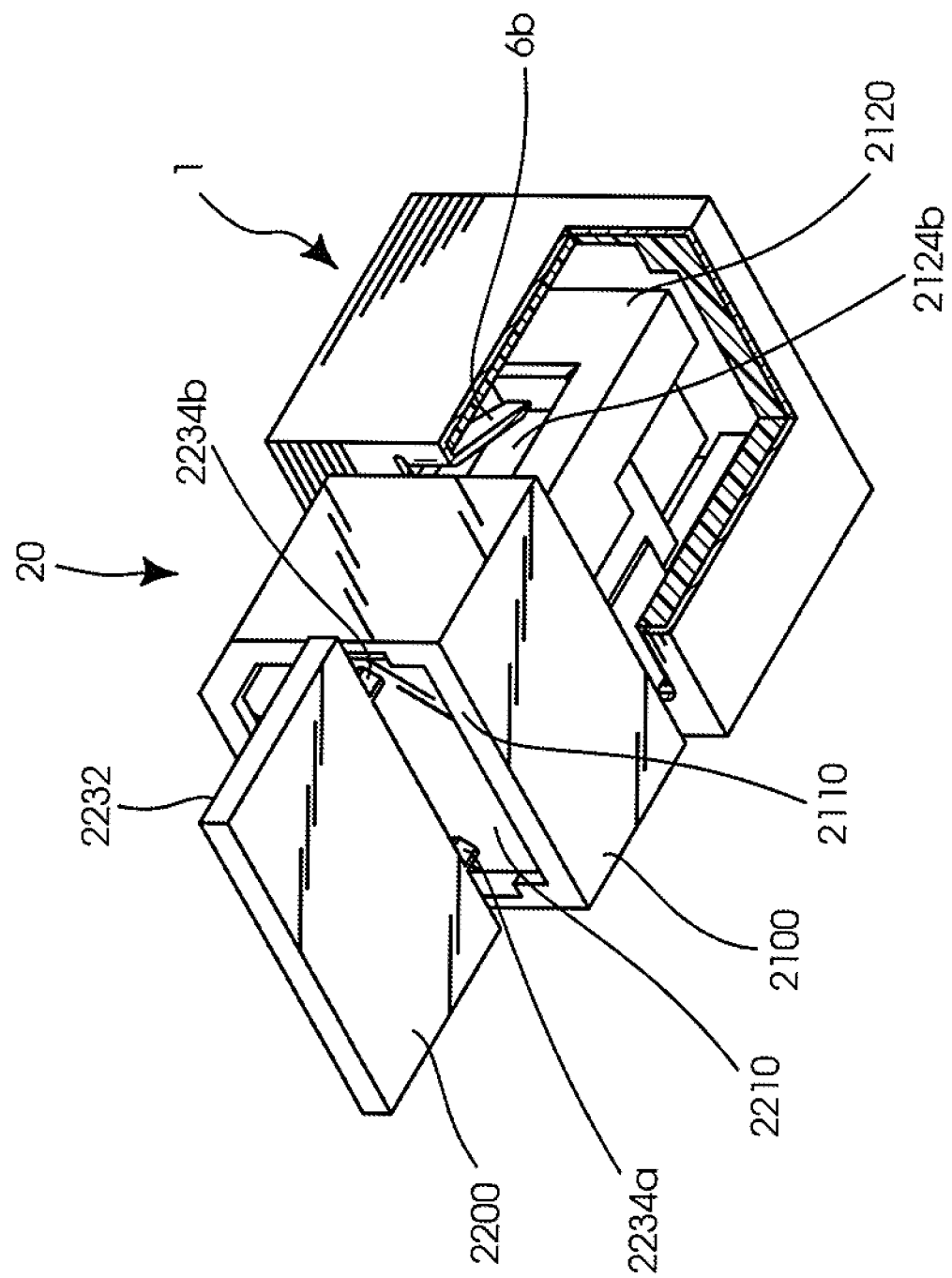
FIG. 13 is a perspective view, partially cut away, of the alternate embodiment shown in FIG. 12B, as assembled in an armed configuration and illustratively installed at a locked position in a conventional communication port, as viewed from a forward-up viewing orientation.
Figure 13A:
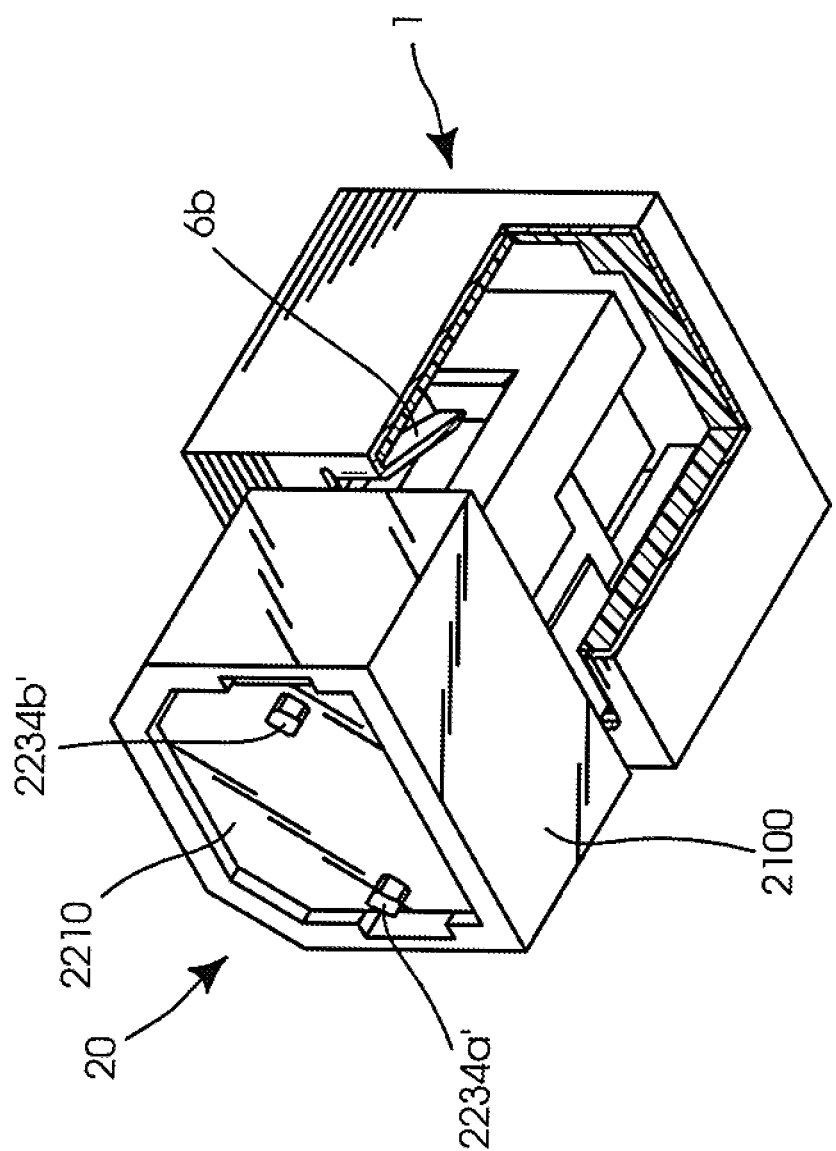
FIG. 13A is a perspective view, partially cut away, of the alternate embodiment as shown installed in FIG. 13, but with a keying portion at least partially removed from a certain part of the embodiment in preparation for a disarming configuration.
Figure 13B:
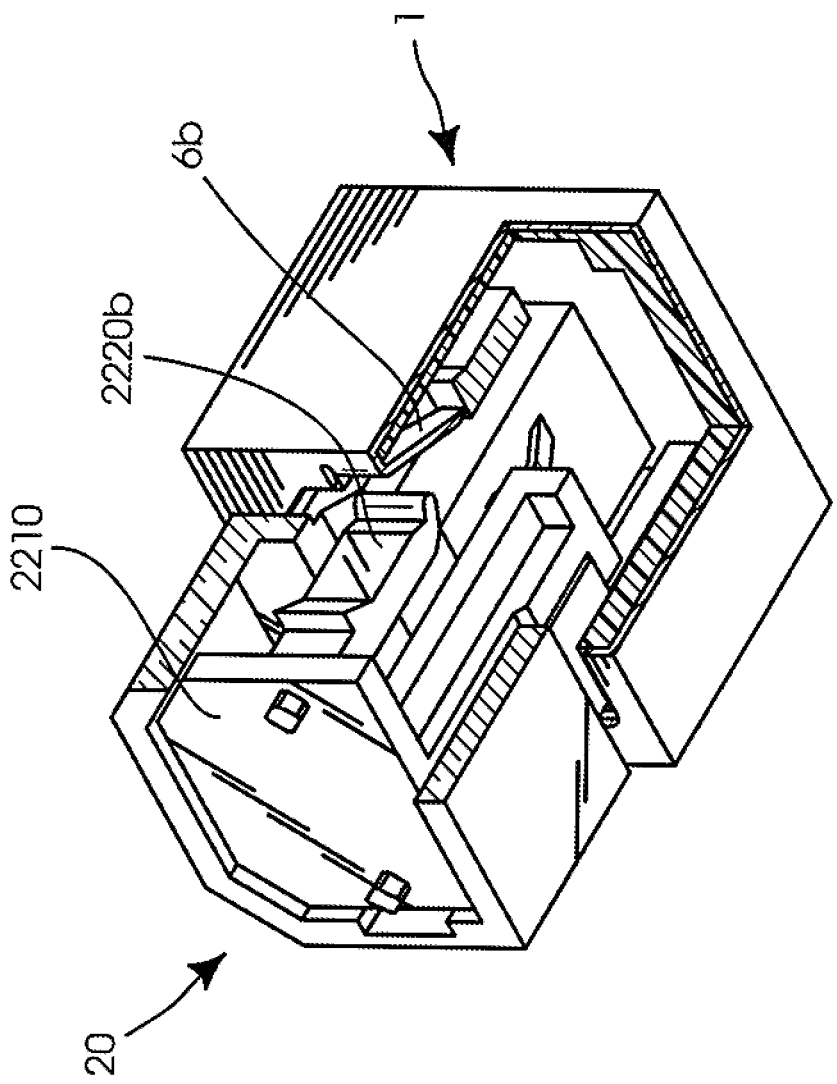
FIG. 13B is another perspective view, partially cut away, of the alternate embodiment as shown installed in FIG. 13A.
Figure 13C:
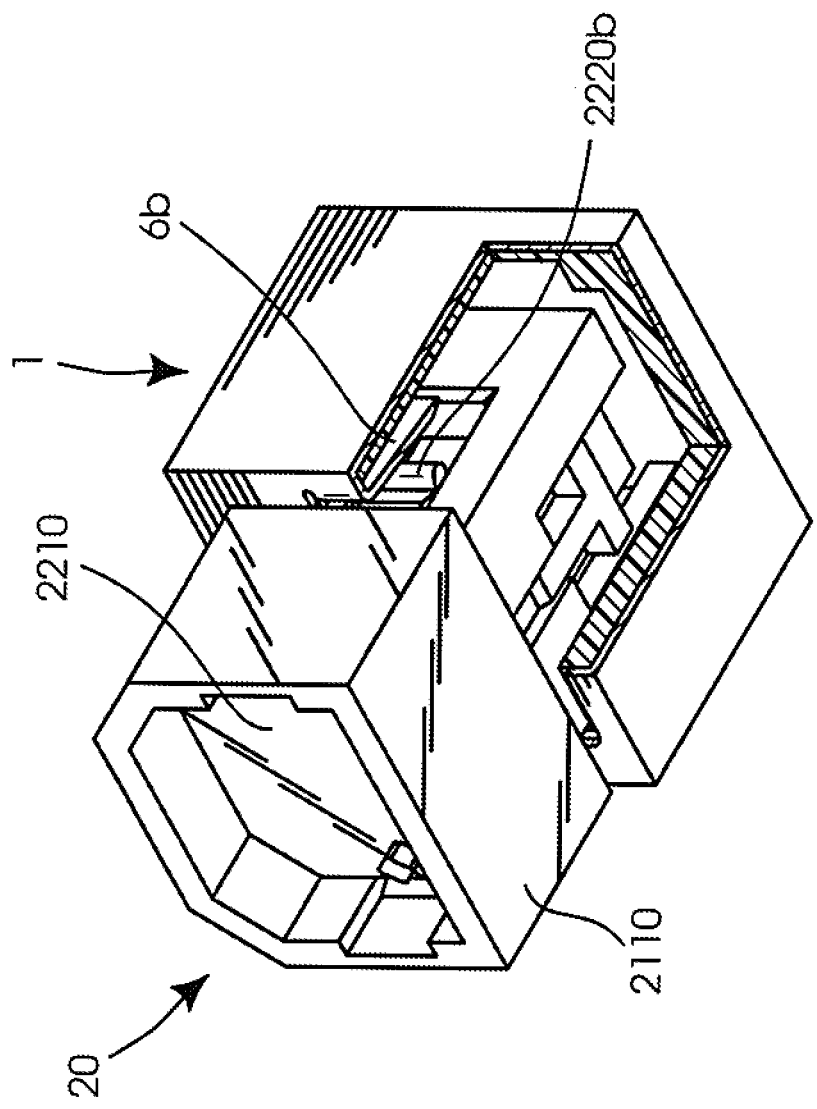
FIG. 13C is a perspective view, partially cut away, of the alternate embodiment as shown installed in FIG. 13A, but with the certain part of the embodiment displaced relative to another part thereof intermediately between a protecting position to a disarming position.
Figure 13D:
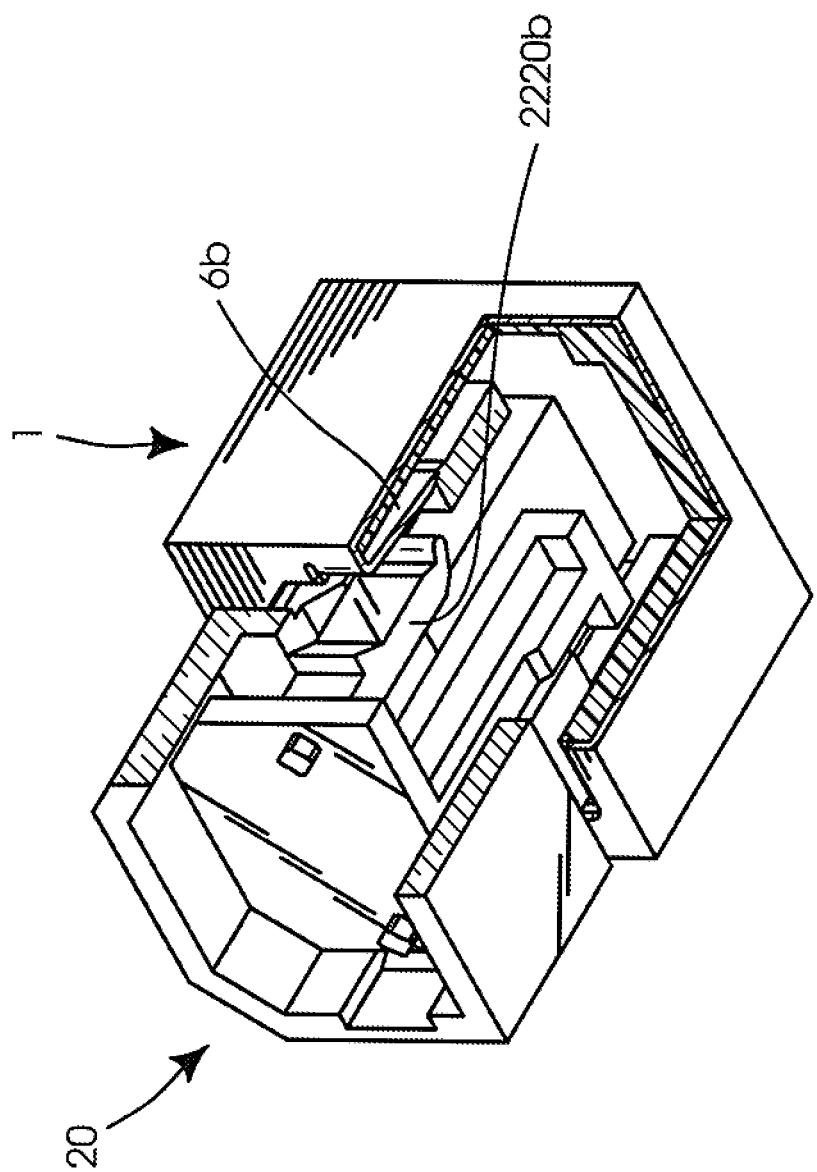
FIG. 13D is another perspective view, partially cut away, of the alternate embodiment as shown installed in FIG. 13C.
Figure 13E:
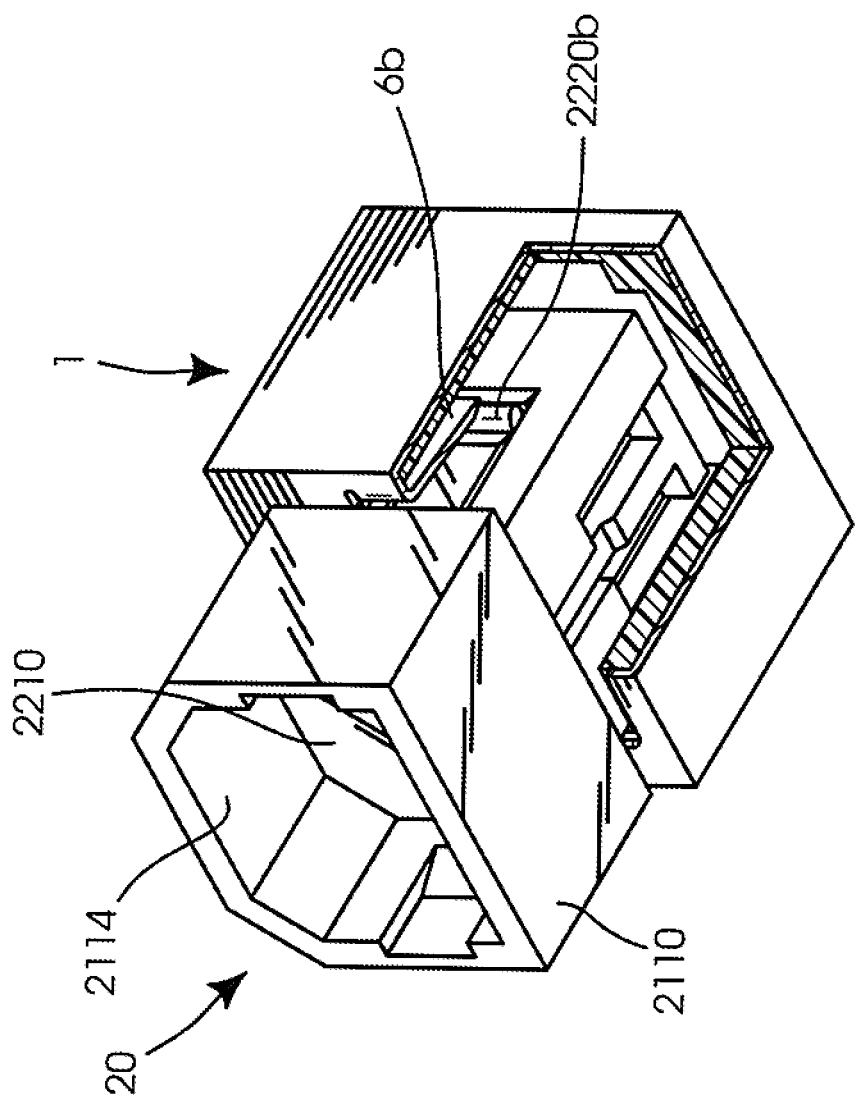
FIG. 13E is a perspective view, partially cut away, of the alternate embodiment as shown installed in FIG. 13A, but with the certain part of the embodiment fully displaced relative to another part thereof from a protecting position to a disarming position for placing the embodiment in a disarming configuration.
Figure 13F:
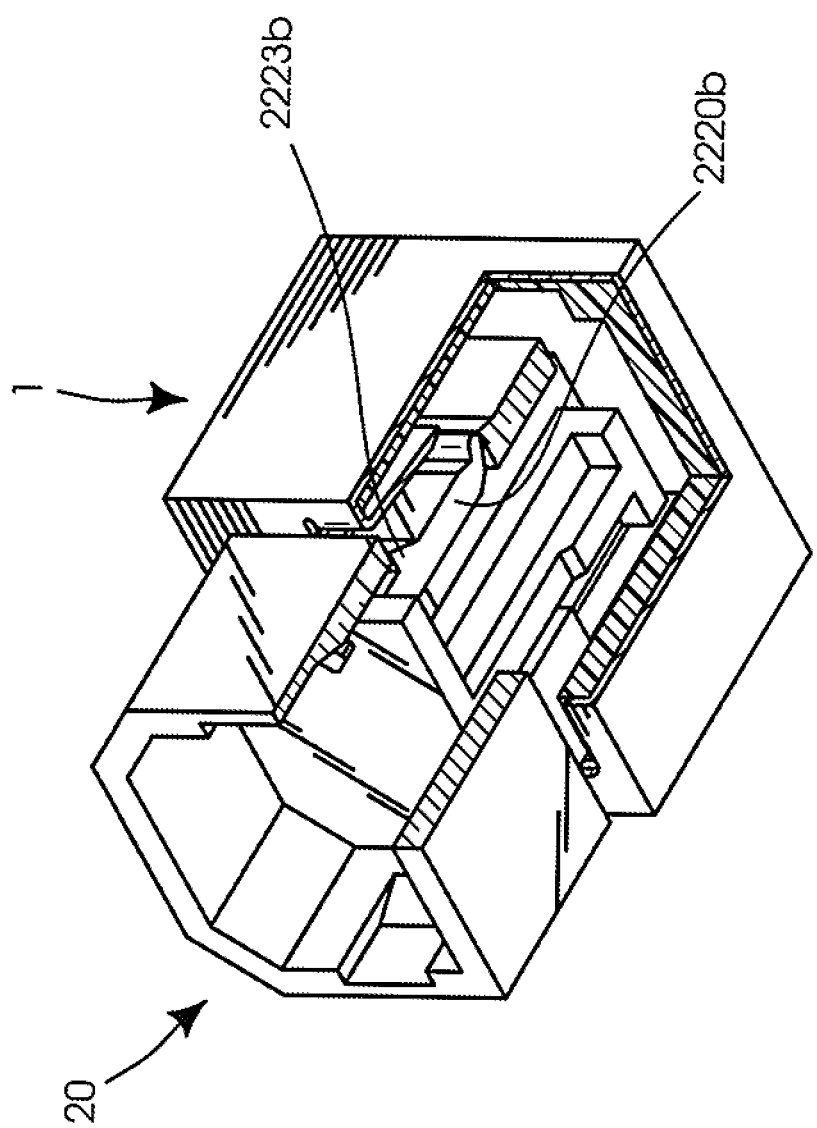
FIG. 13F is another perspective view, partially cut away, of the alternate embodiment as shown installed in FIG. 13E, but disposed in a disarming configuration.

Turning next to FIGS. 13-13F, the port protector 20 is shown installed in the communication port 1 progressively at different stages of use. In FIG. 13, the port protector 20 is shown installed in locked manner on the communication port 1 and disposed at its armed, or protecting, configuration. The key body 2200 at this stage is engaged at its protecting position relative to the lock body 2100. The key body's keying portion 2230 remains attached to its base portion 2210 by the frangible couplings 2234a, 2234b. The base portion 2210 spans across to thereby substantially the opening into the lock body's interface portion 2110. The outer structure and contour of the interface portion 2110 are such that the interface portion 2110 substantially covers and peripherally overlaps the opening into the receptacle defined by the communication port 1.

In this protecting configuration, the port protector 20 blocks the communication port's receptacle against intrusive access. The port protector 20 is locked against withdrawal from the communication port 1, and its key body 2200 is stopped by its keying portion 2230 against any significant insertion further into the lock body 2100. The communication port's retention members 6a, 6b extend in through the transverse window openings 2124a, 2124b of the lock body 2100 to latch its engagement portion 2120 in place.

In FIGS. 13A-13B, the keying portion 2230 of the key body 2200 is detached by severing the frangible couplings 2234a, 2234b as shown (to leave the stubs 2234a', 2234b'). At this instant, the remnants of the key body 2200 remain at the protecting position, with the base portion 2210 still at or near flush with mouth of the opening of the lock body's interface portion 2110. In FIGS. 13C-13D, however, the remnants of the key body 2200 are pushed further into the lock body 2100 towards disarming the port protector 20, as indicated by the sliding longitudinal advancement of the key body's base portion 2210 intermediately through the lock body's interface portion 2110. The free ends of the actuating members 2220a, 2220b have engaged and begun urging the communication port's retention members 6a, 6b transversely (laterally in this embodiment and application) outward from the transverse window openings 2124a, 2124b with the key body's advancement into the lock body 2100.

Figure 14A:
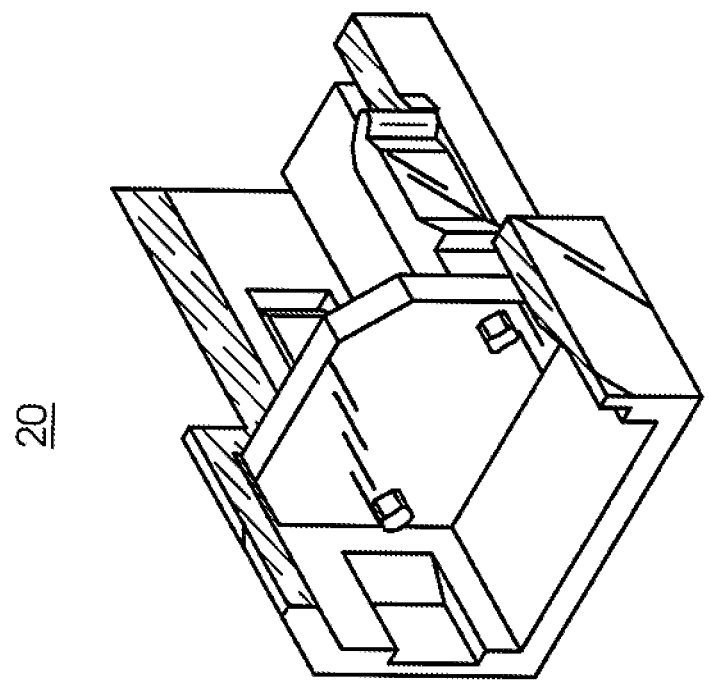
FIG. 14A is another perspective view, partially cut away, of the alternate embodiment as shown in FIG. 14, but viewed from a forward-down viewing orientation; and, FIG. 15 is a perspective view of a port protector formed in accordance with yet another exemplary embodiment of the present invention, shown in an armed configuration for installation into a conventional communication port, formed with certain uniquely identifying indicia.
Figure 14:
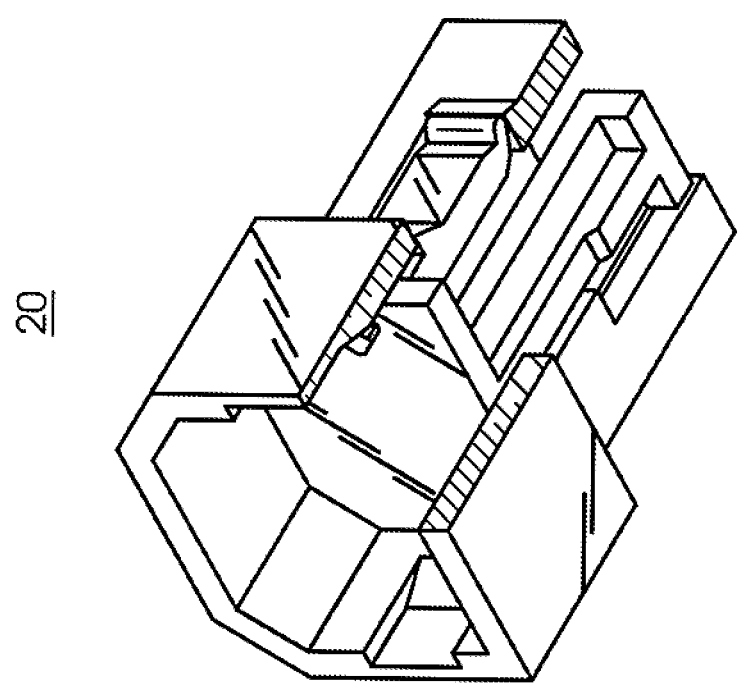
FIG. 14 is perspective view, partially cut away, of the alternate embodiment as shown in FIG. 13E, disposed in the disarming configuration thereof, but removed from the conventional communication port.

Once the remnants of the key body 2200 are sufficiently advanced into the lock body, the free ends of the actuating members 2220a, 2220b have forced the retention members 6a, 6b fully out of the transverse window openings 2124a, 2124b, such that they are cleared out of the way from latching against the back sill surfaces 2124a', 2124b'. This fully disarms the port protector 20, and the lock body 2100 may then be freely removed from the communication port's receptacle. As the remnants of the key body 2220 are advanced to disarm the port protector 20, the actuating members 2220a, 2220b are deflected transversely inward each against its resilient bias as its protrusive clipping structures 2223a, 2223b engage and slide past the constrictive inner wall surfaces 2114 of the interface portion 2110. As shown in FIG. 13F, once the actuating members 2220a, 2220b have advanced far enough past the lock body's interface portion 2110, they are freed to spring transversely outward. At that point, the clipping structures 2223a, 2223b latchingly engage corresponding entry guards formed at the rear edge of that interface portion 2110. This catches the remnants of the key body 2200 in place within the lock body 2100, yielding the collapsed package illustrated in FIGS. 14-14A which may be removed neatly as one unit from the communication port 1.

Figure 15:
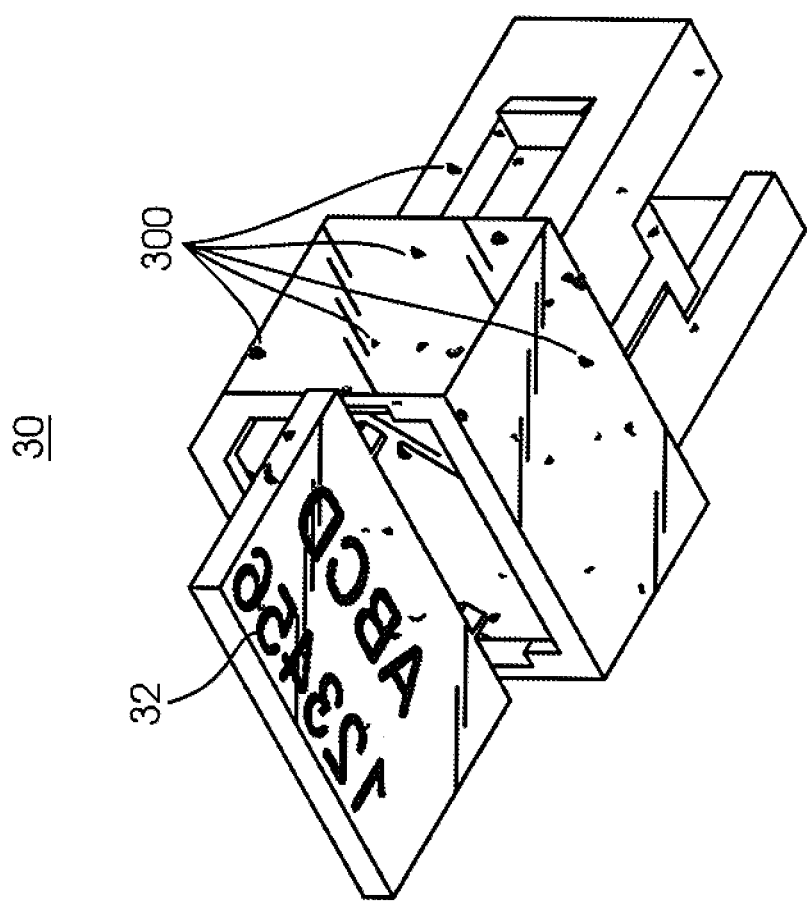

Referring to FIG. 15 showing a port protector 30 formed in accordance with another exemplary embodiment of the present invention, tamper evident protection is enhanced to make it even more difficult to replace an original authentic port protector 30 with an unauthorized replica (after forcibly removing the authentic one) without detection. FIG. 15 illustrates an example of a 'fingerprint' added to the port protector 20 of the preceding embodiment. The port protector 30 is generally of the same structure as described for the port protector 20 in the embodiment illustrated in FIGS. 12-14A. In addition to being labeled with a serial number or other identifying designator 32, the port protector 30 is applied with a seemingly randomized pattern of variously shaped visual indicia 300 such as graphic marks, spots, speckles, or the like to enhance its unique visual profile.

The visual indicia 300 is applied at least on readily visible external surfaces of one or more bodies/portions of the port protector 30. Depending on the particular application, this visual indicia 300 may be pseudo-randomly configured in shape, size, and pattern of arrangement, and is preferably applied on and/or within visible surfaces of at least a part of the port protector. This defines an apparent 'fingerprint' for the port protector 30, presenting an added dimension of difficulty to replicating an authentic port protector closely enough to escape detection.

Where a given part of the port protector 30 is formed of a translucent material as in the embodiment shown, the visual indicia 300 may also be embedded within the material as well. For example, a plurality of pseudo-randomly shaped, sized, and arranged dark speckles 300 may be formed both on and within the material. The visibility of speckles 300 disposed in various parts of the port protector 30 behind or underneath a directly viewed surface, in addition to those formed on the directly viewed surface, adds to the apparent randomness of the speckles 300, thereby augmenting the complexity and uniqueness of the port protector's apparent fingerprint. This in turn raises the difficulty of replicating an original port protector 30 closely enough to escape detection.

In addition to being visual as illustrated in the exemplary embodiment shown, such fingerprinting may be of any other suitable form known in the art for uniquely identifying a given port protector, depending on the particular requirements of a given application. For example, the fingerprinting may be realized through certain patterned surface textures or other tactile indicia incorporated onto the port protector. In another example, the port protector may be formed with uniquely identifying structural properties such as certain asymmetries, imbalances, or the like built in. The subject port protector is not limited to any particular form of fingerprinting or other identity enhancement measure that may be employed, depending on the particularly intended embodiment and application.

The various bodies of the port protector 10, 20, 30 (and portions thereof) as disclosed herein may each be formed of any suitable material known in the art having the requisite electrical and mechanical properties for the particularly intended embodiment and application. In the embodiments shown, the various bodies/portions of the port protector 10, 20 are preferably formed of a polycarbonate, acrylic, or other thermoplastic polymer material. The material preferably provides sufficient electrical insulation to avoid undue shock hazard and offers sufficient rigidity and strength to maintain stable locking engagement of the communication port 1, while readily subject to surface indentation, scratching, cutting, and tear where needed (as in the case, for example, of the frangible couplings 234a, 234b).

The various bodies of the port protector 10, 20, 30 are preferably provided assembled in a package, effectively as one single-piece unit that may be conveniently handled by a user in the field and simply installed on a communication port to be protected without any special preparation or manipulation. While certain parts of the port protector are shown in the illustrated embodiments to be integrally formed, any or all such parts may be include constituent parts that may be discretely formed then fused or otherwise affixed to one another by suitable means known in the art prior to delivery or deployment. In certain embodiments, however, various parts of the key body as well as the lock body are preferably formed integrally with one another using molding processes or other such suitable means known in the art. Furthermore, the various bodies, portions, and members of the port protector 10, 20, 30 may be shaped with curvilinear or other contours different from those illustratively shown herein. They may be adapted in structure and contour to better suit the needs of the particularly intended application in other embodiments.

The port protector 10, 20, 30 in accordance with certain aspects of the present invention is provided for use as a single unit whose various bodies are pre-assembled together in one conveniently handled package. In certain applications, the port protector 10, 20, 30 may be installed prior to deployment of the given equipment. In other applications, the equipment may already be deployed, and a communication port 1 to be protected 'buried' amidst a forest of surrounding cables and other hardware-especially if provided on electrical equipment held in a rack with numerous other equipment. Communication ports 1 in such situations may require dexterous and strained contortion of the user to reach. The ability to easily hold the single package port protector 10, 20, 30 and lock the same to the communication port 1 with one hand greatly facilitates the task of its safe installation.

In the embodiments shown, the port protector 10, 20, 30 is illustratively configured for use to protect a USB type B data port. In other embodiments, it may be adapted for use with other types of communication ports such as SFP data ports, HDMI data ports, or the like, as required for the particularly intended applications. While shown in the illustrated embodiments configured for locking insert in a single communication port 1, the port protector 10, 20, 30 in certain other embodiments may be expanded in configuration for locking insert into multiple communication ports at once.

Although this invention has been described in connection with specific embodiments and forms thereof, it will be appreciated that various modifications other than those described or mentioned above may be resorted to without departing from the spirit or scope of the invention as defined in the appended claims. For example, functionally equivalent elements may be substituted for those specifically shown and described, certain features may be used independently of other features, and in certain cases, particular locations of elements or particular ordering of method steps or processes may be reversed or interposed, all without departing from the spirit or scope of the invention as defined in the appended claims.

What is claimed is:

1. A disarmable port protector for locking engagement of a communication port of electronic equipment, comprising:

a lock body for retentively engaging the communication port when disposed at a locking position, said lock body having an interface portion and an engagement portion extending longitudinally therefrom; and, a key body displaceably coupled to said lock body, said key body being displaceable from at least a protecting position to a disarming position relative to said lock body, said key body including:

a base portion;

a disarming portion extending longitudinally from said base portion, said disarming portion in the disarming position disengaging said lock body from the communication port for withdrawal from the locking position; and, a keying portion extending from said base portion for stopping engagement of said lock body when in the protecting position;

wherein said key body is released for displacement to advance further into the communication port to the disarming position upon said keying portion being at least partially . . . displaced relative to said base portion to thereby disfigure said key body in tamper evident manner.

2. The disarmable port protector as recited in claim 1, wherein said key body further includes a tongue portion extending longitudinally from said base portion for retentively engaging said lock body when in the protecting position, said tongue portion being configured to latch against said engagement portion of said lock body upon said key body being disposed in the protecting position.

3. The disarmable port protector as recited in claim 2, wherein said engagement portion in the locking position is at least partially inserted into the communication port and configured to receive longitudinally therein a substrate member projecting from the communication port, said tongue portion thereby passing at least partially beneath the substrate member to be retained thereby in latching engagement with said engagement portion of said lock body at the protecting position.

4. The disarmable port protector as recited in claim 1, wherein said engagement portion of said lock body includes at least one transverse opening for receiving a retention member projecting transversely from the communication port when in the locking position, said lock body in the locking position being thereby locked against removal from the communication port.

5. The disarmable port protector as recited in claim 4, wherein said disarming portion of said key body includes at least one actuating member projecting from said base portion, said actuating member in the disarming position displacing at least a portion of the retention member of the communication port to release said lock body therefrom.

6. The disarmable port protector as recited in claim 1, wherein said key body is secured to said lock body when in the disarming position to maintain said disarmable port protector in a disarmed configuration for unobstructed removal from the communication port.

7. The disarmable port protector as recited in claim 6, wherein said disarming portion of said key body includes a plurality of actuating members projecting from said base portion, each said actuating member being configured to deflect a retention member of the communication port out of engagement with said lock body when in the disarming position, each said actuating member including a resilient part configured to clip against said lock body to secure the disarmed configuration when in the disarming position.

8. The disarmable port protector as recited in claim 1, wherein said interface portion of said lock body defines an interface chamber, and said base portion of said key body forms a shield structure extending transversely across said interface chamber to substantially block open access thereto.

9. The disarmable port protector as recited in claim 1, wherein said keying portion of said key body is joined to said base portion thereof by a frangible coupling, said keying portion being at least partially detached from said base portion by severing said frangible coupling to release said key body for displacement relative to the lock body into the disarming position.

10. The disarmable port protector as recited in claim 1, wherein said lock body is configured for locking insert into a communication port having a Universal Serial Bus (USB) Type-B form.

11. The disarmable port protector as recited in claim 1, wherein at least one of said lock and key bodies is formed with visual indicia pseudo-randomly configured in shape, size, and pattern of arrangement to define an apparent fingerprint for the disarmable port protector.

12. A port protector having tamper evident disarmament for releasable locking insert into a communication port of electronic equipment, comprising:

a lock body configured to retentively engage the communication port when disposed at a locking position therein, said lock body having an interface portion defining an interface chamber and an engagement portion defining an engagement chamber extending longitudinally therefrom, said engagement portion in the locking position being at least partially inserted into and retentively engaged with the communication port; and, a key body coupled in coaxially displaceable manner to said lock body, said key body being displaceable into said engagement chamber of said lock body from a protecting position to a disarming position relative thereto, said key body including:
 a base portion configured to extend transversely across said interface chamber of said lock body to substantially block access therethrough when in the protecting position;
 a tongue portion extending longitudinally from said base portion for retentively engaging said lock body when in the protecting position;
 a disarming portion extending longitudinally from said base portion into said engagement chamber when in the disarming position for releasing said lock body from retentive engagement with the communication port; and,
 a keying portion extending from said base portion, said keying portion in the protecting position being stopped by said interface portion of said lock body to prevent further axial displacement of said key body into said lock body toward the disarming position;
wherein said key body is released for displacement to advance further into the communication port to the disarming position upon said keying portion being at least partially displaced relative to said base portion to thereby disfigure said key body in tamper evident manner.

13. The port protector as recited in claim 12, wherein said keying portion of said key body is joined to said base portion thereof by at least one frangible coupling, said keying portion being at least partially detached from said base portion to disengage from said interface portion of said lock body responsive to the at least one frangible coupling being severed, said key body being thereby released for displacement to the disarming position relative to said lock body.

14. The port protector as recited in claim 12, wherein:
said engagement portion of said lock body includes at least one transverse opening for receiving a deflective retention member projecting transversely from the communication port, said lock body in the locking position being latched by the retention member against removal from the communication port; and,
said disarming portion of said key body includes a plurality of actuating members projecting deflectively from said base portion, each said actuating member in the disarming position extending to deflect the retention member of the communication port out of said transverse opening of said engagement portion to unlatch said lock body therefrom.

15. The port protector as recited in claim 12, wherein said disarming portion of said key body includes a resilient part clipped to said lock body when in the disarming position to retain said port protector in a disarmed configuration for unobstructed removal from the communication port.

16. The port protector as recited in claim 12, wherein said lock body is configured for locking insert into a communication port having a Universal Serial Bus (USB) Type-B form.

17. The port protector as recited in claim 12, wherein at least one of said lock and key bodies is formed of a translucent material having embedded therein a plurality of speckles forming visual indicia pseudo-randomly configured in shape, size, and pattern of arrangement to define an apparent fingerprint for the port protector.

18. A reconfigurable port protector having onboard disarming for tamper evident release from locking engagement of a communication port of electronic equipment, comprising:
a lock body configured to retentively engage the communication port when disposed at a locking position therein, said lock body having an interface portion defining an interface chamber and an engagement portion defining an engagement chamber in communication with said interface chamber, said engagement portion in the locking position being at least partially inserted into and retentively engaged with the communication port; and,
a key body coupled in coaxially displaceable manner to said lock body, said key body being displaceable into said engagement chamber of said lock body from a protecting position to a disarming position relative thereto, said key body when in the disarming position being secured to said lock body to maintain said reconfigurable port protector in a disarmed configuration for unobstructed removal from the communication port, said key body including:
 a base portion configured to extend transversely across said interface chamber of said lock body to substantially block access therethrough when in the protecting position;
 a tongue portion extending longitudinally from said base portion for retentively engaging said lock body when in the protecting position;
 a disarming portion extending longitudinally from said base portion into said engagement chamber when in the disarming position for releasing said lock body from retentive engagement with the communication port; and,
 a keying portion extending from said base portion to be stopped by said interface portion of said lock body when in the protecting position to prevent further axial displacement of said key body into said lock body toward the disarming position, said keying portion being joined to said base portion by at least one frangible coupling;

wherein said key body is released for displacement to advance further into the communication port to the disarming position relative to said lock body in tamper evident manner responsive to the at least one frangible coupling being severed, said keying portion thereby being at least partially detached from said base portion to disfigure said key body for releasing displacement away from said interface portion of said lock body.

19. The reconfigurable port protector as recited in claim 18, wherein said disarming portion includes a plurality of actuating members each projecting to deflect a retention member of the communication port out of engagement with said lock body when in the disarming position, each said actuating member being biased to clip against said lock body to secure the disarmed configuration when in the disarming position.

20. The reconfigurable port protector as recited in claim 19, wherein:
   said tongue portion of said key body is configured to latch against said engagement portion of said lock body upon displacement beyond said interface portion to the protecting position; and,
   said engagement portion in the locking position is at least partially inserted into the communication port and configured to receive longitudinally therein a substrate member projecting from the communication port;
   said tongue portion thereby passing at least partially beneath the substrate member to be retained thereby in latching engagement with said engagement portion of said lock body at the protecting position.

* * * * *